(12) United States Patent
Kim et al.

(10) Patent No.: US 10,191,590 B2
(45) Date of Patent: Jan. 29, 2019

(54) TOUCH WINDOW

(71) Applicant: LG Innotek Co., Ltd., Seoul (KR)

(72) Inventors: Seung Jin Kim, Seoul (KR); Jong Sun Kim, Seoul (KR); Byung Youl Moon, Seoul (KR); Ja Ram Kim, Seoul (KR); Dong Mug Seong, Seoul (KR); Jae Hong Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 53 days.

(21) Appl. No.: 15/316,426

(22) PCT Filed: Jul. 8, 2015

(86) PCT No.: PCT/KR2015/007036
§ 371 (c)(1),
(2) Date: Dec. 5, 2016

(87) PCT Pub. No.: WO2014/006923
PCT Pub. Date: Jan. 14, 2016

(65) Prior Publication Data
US 2017/0153762 A1 Jun. 1, 2017

(30) Foreign Application Priority Data

Jul. 11, 2014 (KR) .................. 10-2014-0087589
Nov. 25, 2014 (KR) .................. 10-2014-0165687
Dec. 31, 2014 (KR) .................. 10-2014-0195155

(51) Int. Cl.
*G06F 3/041* (2006.01)
*G06F 3/044* (2006.01)
*G06F 3/045* (2006.01)

(52) U.S. Cl.
CPC ............ *G06F 3/0418* (2013.01); *G06F 3/044* (2013.01); *G06F 3/045* (2013.01);
(Continued)

(58) Field of Classification Search
CPC . G06F 2203/04101; G06F 2203/04104; G06F 2203/04112; G06F 3/0418; G06F 3/044
(Continued)

(56) References Cited

U.S. PATENT DOCUMENTS 9,720,551 B2 * 8/2017 Sohn .................. G06F 3/044
9,898,125 B2 * 2/2018 Yang ................. G06F 3/0416
(Continued)

FOREIGN PATENT DOCUMENTS

KR     10-2013-0074933 A     7/2013
KR        20130074933 A      7/2013

OTHER PUBLICATIONS

International Search Report in International Application No. PCT/KR2015/007036, filed Jul. 8, 2015.

*Primary Examiner* — Tony Davis
(74) *Attorney, Agent, or Firm* — Saliwanchik, Lloyd & Eisenschenk

(57) ABSTRACT

A touch window according to one embodiment includes a substrate including an active area and an unactive area defined therein; a sensing electrode on the substrate; and a wire electrode connected to the sensing electrode, wherein the wire electrode includes a first wire electrode and a second wire electrode, and the first or second wire electrode is formed in a mesh shape.

20 Claims, 29 Drawing Sheets

(52) U.S. Cl.
CPC ............. *G06F 2203/04101* (2013.01); *G06F 2203/04103* (2013.01); *G06F 2203/04104* (2013.01); *G06F 2203/04112* (2013.01); *G06F 2203/04113* (2013.01)

(58) Field of Classification Search
USPC .................................................. 345/170–176
See application file for complete search history.

(56) References Cited

U.S. PATENT DOCUMENTS

| | | | |
|---|---|---|---|
| 9,927,913 B2* | 3/2018 | Yang ..................... | G06F 3/0416 |
| 2012/0062507 A1* | 3/2012 | Kim ........................ | G06F 3/044 |
| | | | 345/174 |
| 2012/0098781 A1* | 4/2012 | Kim ........................ | G06F 3/044 |
| | | | 345/174 |
| 2013/0278513 A1 | 10/2013 | Jang | |
| 2014/0043280 A1* | 2/2014 | Cok ........................ | G06F 3/044 |
| | | | 345/174 |
| 2014/0049485 A1 | 2/2014 | Oh et al. | |
| 2014/0069796 A1 | 3/2014 | Kang et al. | |
| 2014/0152917 A1* | 6/2014 | Lee ......................... | G06F 3/044 |
| | | | 349/12 |
| 2014/0293150 A1* | 10/2014 | Tang ....................... | G06F 3/044 |
| | | | 349/12 |
| 2014/0299361 A1* | 10/2014 | Nakamura .............. | G06F 3/044 |
| | | | 174/253 |
| 2015/0185889 A1* | 7/2015 | Nakamura .............. | G06F 3/044 |
| | | | 345/173 |
| 2015/0199049 A1* | 7/2015 | Yang ....................... | G06F 3/044 |
| | | | 345/174 |
| 2015/0227239 A1* | 8/2015 | Kim ........................ | G06F 3/044 |
| | | | 345/174 |

* cited by examiner

*287

*295

TOUCH WINDOW

CROSS-REFERENCE TO RELATED APPLICATIONS

This application is the U.S. national stage application of International Patent Application No. PCT/KR2015/007036, filed Jul. 8, 2015, which claims priority to Korean Application Nos. 10-2014-0195155, filed Dec. 31, 2014; 10-2014-0165687, filed Nov. 25, 2014; and 10-2014-0087589, filed Jul. 11, 2014, the disclosures of each of which are incorporated herein by reference in their entirety.

TECHNICAL FIELD

The embodiment relates to a touch window.

BACKGROUND ART

Recently, a touch panel, which performs an input function through the touch of an image displayed on a display device by an input device, such as a stylus pen or a finger, has been applied to various electronic appliances.

The touch panel may be typically classified into a resistive touch panel and a capacitive touch panel. In the resistive touch panel, the position of the touch point is detected by detecting the variation of resistance according to the connection between electrodes when pressure is applied to an input device. In the capacitive touch panel, the position of the touch point is detected by detecting the variation of capacitance between electrodes when a finger of the user is touched on the capacitive touch panel. When taking into consideration the convenience of a fabrication scheme and a sensing power, the capacitive touch panel has been spotlighted in a smaller model touch panel recently.

The touch panel may include a substrate on which a sensing electrode and a wire electrode connected to the sensing electrode are disposed, and the position of the touch point may be detected by detecting the variation of capacitance when the area in which the sensing electrode is disposed is touched.

In this case, the sensing and wire electrodes may be disposed on one surface of a single substrate or each one surface of plural substrates.

When the sensing and wire electrodes are disposed on one surface of a single substrate, the wire electrode may be drawn out in various directions. For example, the wire electrode may extend from an active area to an unactive area.

One of the wire electrodes disposed on the active and unactive areas may have a mesh shape, and another wire electrode may include a bulk wire electrode.

Thus, the wire electrode having the mesh shape and the wire electrode having a bulk shape may be short-circuited with each other, so that the reliability may be deteriorated.

Therefore, there is a need to provide a touch window having a new structure which may solve the above-mentioned problems.

DISCLOSURE

Technical Problem

The embodiment is to provide a touch window having improved reliability. In addition, the embodiment is to provide a touch window having improved touch sensitivity and visibility.

Technical Solution

According to one embodiment, there is provided a touch window which includes a substrate; a sensing electrode on the substrate; and a wire electrode connected to the sensing electrode, wherein the wire electrode includes a first wire electrode and a second wire electrode, and the first or second wire electrode is formed in a mesh shape.

Advantageous Effects

According to the touch window of an embodiment, the wire electrode having the mesh shape and the wire electrode having the bulk shape may be connected to each other through the reinforcement electrode disposed on at least one of the active and unactive areas.

Thus, the wire electrode having the mesh shape and the wire electrode having the bulk shape may be easily connected to each other, so that the contact area is increased, thereby preventing the wire electrodes from being short-circuited with each other.

In addition, the reinforcement electrode is formed in the mesh shape and to have the line width and pitch different from those of the wire electrode having the mesh shape, so that the wire electrode having the mesh shape and the reinforcement electrode may be easily connected to each other and the contact number of the mesh lines may be increased, thereby preventing the wire electrodes from being short-circuited with each other.

Therefore, the touch window according to the embodiment may have improved reliability.

In addition, according to the touch window of the embodiment, the active area AA serving as a screen area may be maximized, the bezel serving as the unactive area UA may be minimized, so that a design limitation caused by the bezel may be overcome.

In addition, the touch window according to an embodiment may directly sense the variation of capacitance induced between the sensing electrode and a conductor, so that the touch sensitivity may be improved and it is possible to implement proximity sensing.

In addition, according to the touch window of the embodiment, the gap between the sensing electrodes may be enlarged so that the sensing electrodes may be prevented from being short circuited with each other due to foreign substances.

In addition, according to the touch window of the embodiment, the dummy part may be interposed between the sensing parts, so that the optical characteristics and the visibility of the touch window may be improved.

In addition, according to the touch window of the embodiment, the accuracy in sensing the touch point may be improved and the multi-touch may be implemented through various patterns of the sensing electrode.

MODE FOR INVENTION

Figure 1:
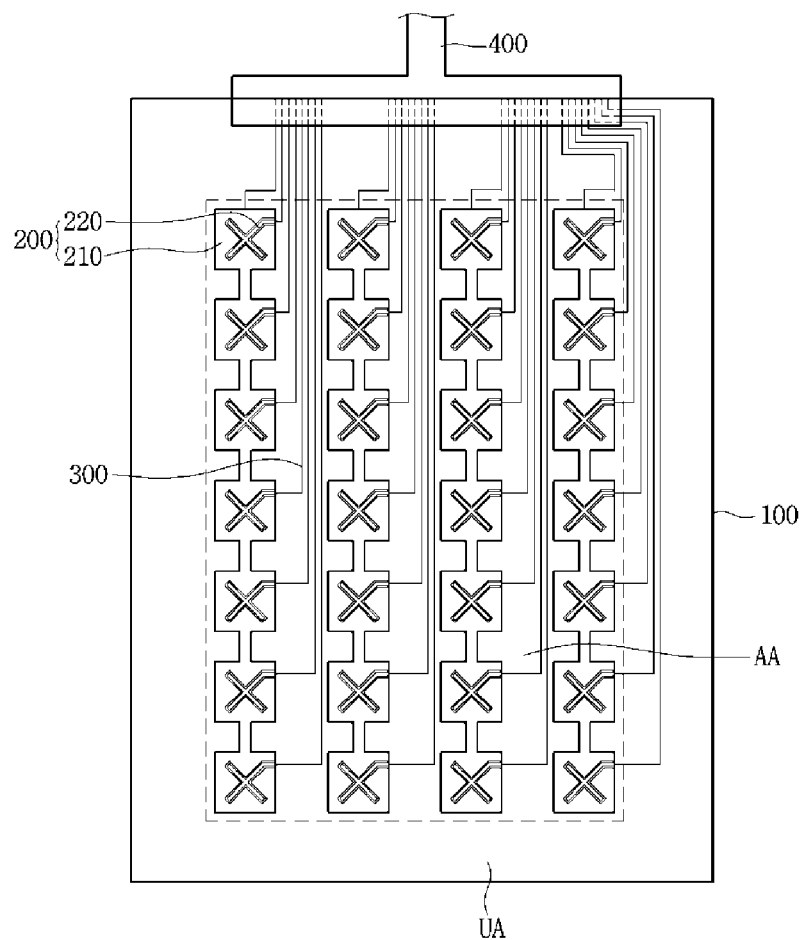
FIG. 1 is a plan view showing a touch window according to an embodiment.

In the description of the embodiments, it will be understood that, when a layer (or film), a region, a pattern, or a structure is referred to as being "on" or "under" another substrate, another layer (or film), another region, another pad, or another pattern, it can be "directly" or "indirectly" on the other substrate, layer (or film), region, pad, or pattern, or one or more intervening layers may also be present. Such a position of the layer has been described with reference to the drawings.

The thickness and size of each layer (film), region, pattern, or structure shown in the drawings may be exaggerated, omitted or schematically drawn for the purpose of convenience or clarity. In addition, the size of each layer (film), region, pattern, or structure does not utterly reflect an actual size.

Hereinafter, an embodiment will be described in detail with reference to accompanying drawings.

Referring to FIGS. 1 to 13, a touch window according to an embodiment may include a substrate 100, a sensing electrode 200, a wire electrode 300 and a printed circuit board 400.

The substrate 100 may include chemically tempered/semi-tempered glass, such as soda lime glass or aluminosilicate glass, reinforced/flexible plastic, such as polyimide (PI), polyethylene terephthalate (PET), propylene glycol (PPG), or poly carbonate (PC), or sapphire. The sapphire has superior electric characteristics, such as permittivity, so that a touch response speed may be greatly increased and a space touch such as hovering may be easily implemented. In addition, since the sapphire has high surface hardness, the sapphire is applicable to a cover substrate. The hovering refers to a technique of recognizing coordinates even at a slight distance from a display.

In addition, the substrate 100 may include an optically isotropic film. For example, the substrate 100 may include cyclic olefin copolymer (COC), cyclic olefin polymer (COP), optically isotropic polycarbonate (PC), or optically isotropic polymethyl methacrylate (PMMA).

In addition, the substrate 100 may be bent to have a partial curved surface. That is, the substrate 100 may be bent to have a partial flat surface and a partial curved surface. In detail, an end of the substrate 100 may be bent to have a curved surface or may be bent or flexed to have a surface including a random curvature.

In addition, the substrate 100 may include a flexible substrate having a flexible property.

*46In addition, the substrate 100 may include a curved or bended substrate. That is, a touch window including the substrate 100 may be formed to have a flexible, curved or bended property. For this reason, the touch window according to the embodiment may be easily portable and may be variously changed in design.

The sensing electrode 200, the wire electrode 300 and the printed circuit board 400 may be disposed on the substrate 100. That is, the substrate 100 may be a support substrate.

The substrate 100 may include a cover substrate. That is, the sensing electrode 200, the wire electrode 300 and the printed circuit board 400 may be supported by the cover substrate. In addition, an additional cover substrate may be further disposed on the substrate 100. That is, the sensing electrode 200, the wire electrode 300 and the printed circuit board 400 may be supported by the substrate 100, and the substrate 100 and the cover substrate may be combined with (adhere to) each other through an adhesive layer.

The substrate 100 may have an active area AA and an unactive area UA defined therein.

An image may be displayed in the active area AA. The image is not displayed in the unactive area UA provided at a peripheral portion of the active area AA.

In addition, the position of an input device (e.g., finger) may be sensed in at least one of the active area AA and the unactive area UA. If the input device, such as a finger, touches the touch window, the variation of capacitance occurs in the touched part by the input device, and the touched part subject to the variation of the capacitance may be detected as a touch point.

Meanwhile, the sensing electrode 200 may be disposed on the substrate 100. In detail, the sensing electrode 200 may be disposed on at least one of the active area AA and the unactive area UA. Preferably, the sensing electrode 200 may be disposed on the active area AA of the substrate.

The sensing electrode 200 may include first and second sensing electrodes 210 and 220.

The first and second sensing electrodes 210 and 220 may be disposed on one surface of the substrate 100. In detail, the first and second electrodes 210 and 220 may be disposed on the same surface of the substrate 100. That is, the first and second electrodes 210 and 220 may be disposed on the same surface of the substrate 100 while being spaced apart from each other, such that the first and second electrodes 210 and 220 may not make contact with each other.

Generally, in the capacitive touch window, an upper substrate having a first electrode pattern having the first directionality and a lower substrate having a second electrode pattern having the second directionality are spaced apart from each other. Alternatively, an insulator is interposed between the first and second electrode patterns formed one substrate so that the first and second electrode patterns do not make contact with each other. In addition, an electrode wire connected with an electrode pattern is formed on the substrate to transmit the variation of capacitance, which occurs between the first and second electrode patterns as the input device touches the touch screen, to a controller. Regarding the capacitive touch screen, as the usefulness of multi-touches is introduced recently, the number of electrode patterns is increased, so that the number of electrode wires is increased. That is, according to the capacitive touch screen of the related art, the upper and lower substrates are provided, respectively and the electrode pattern and the electrode wire are formed, or electrodes are insulated from each other by using an insulating material on one substrate, so that the structure of the touch screen is complicated. In addition, an additional insulator is required to allow the electrode patterns formed on the upper and lower substrates to be spaced apart from each other. Furthermore, when the electrode pattern and the electrode wire are formed on the upper and lower substrates provided in the form of flat members, the window formed on the upper substrate and the electrode pattern are maintained to be spaced part from each other by a predetermined distance, so that the touch sensitivity may be degraded (due to the distance between the input means making contact with an outer surface of the window and the electrode pattern).

To overcome the above-described problem, according to the embodiment, the sensing electrode 200 is formed on one substrate, and the first and second sensing electrodes are spaced apart from each other to be insulated from each other without using any insulating layers, so that the electrode patterns and the wires may be arranged without complexity and the touch sensitivity may be improved.

At least one of the first and second sensing electrodes 210 and 220 may include a transparent conductive material that allows electricity to flow therethrough without interrupting transmission of light. For example, the sensing electrode 200 may include metal oxide such as indium tin oxide (ITO), indium zinc oxide (IZO), copper oxide, tin oxide, zinc oxide, or titanium oxide.

In addition, the sensing electrode 200 may include a nanowire, a photo sensitive nanowire film, a carbon nanotube (CNT), grapheme or conductive polymer.

In addition, the sensing electrode 200 may include various metals. For example, the sensing electrode 200 may include at least one of Cr, Ni, Cu, Al, Ag, Mo and the alloy thereof.

At least one of the first and second sensing electrodes 210 and 220 may be formed in a mesh shape. In detail, at least one of the first and second sensing electrodes 210 and 220 may include a plurality of sub-electrodes. The sub-electrodes may be disposed in a mesh shape while crossing each other.

Figure 2:
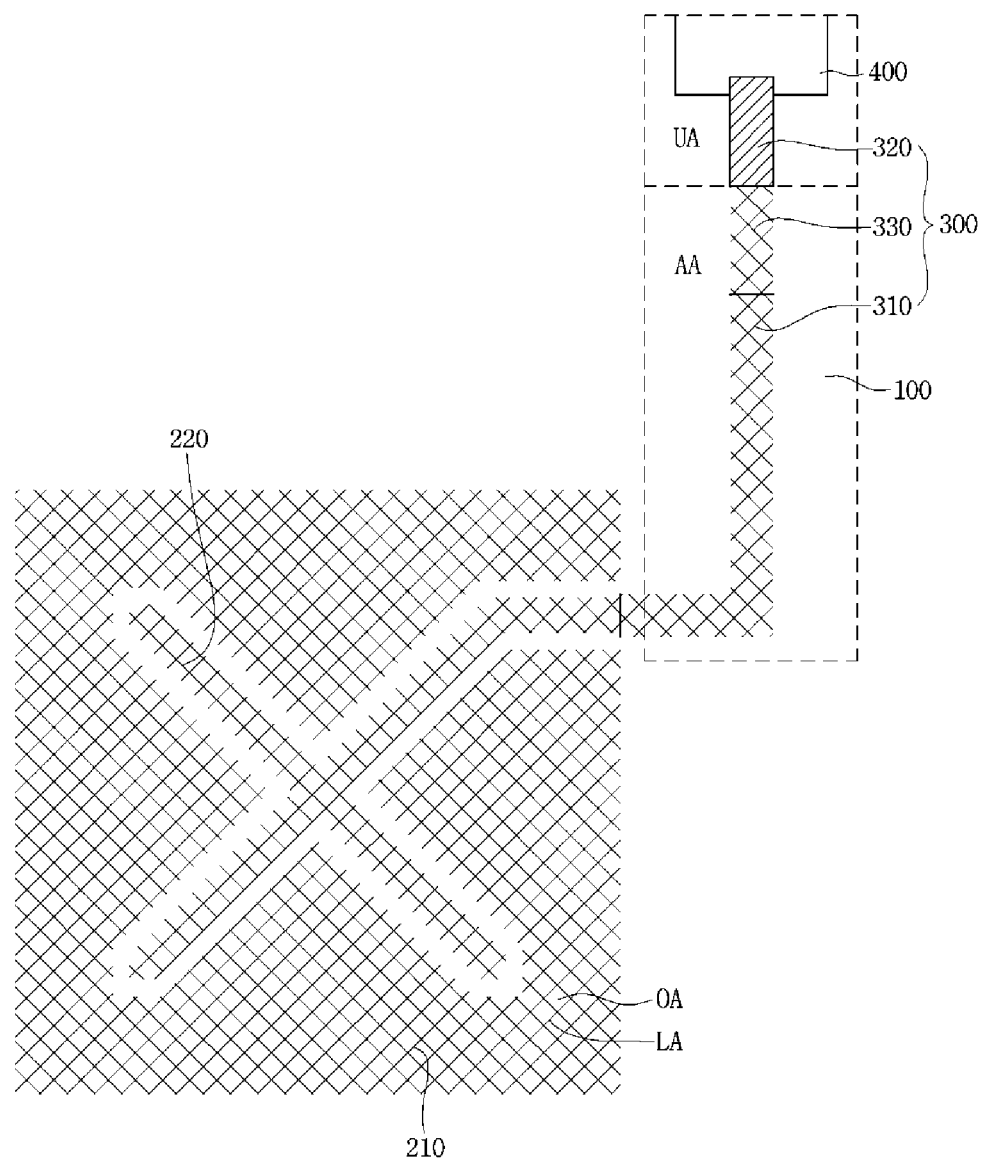
FIGS. 2 to 12 are enlarged views showing wire electrodes according to various embodiments.

In detail, referring to FIG. 2, at least one of the first and second sensing electrodes 210 and 220 may include mesh lines LA formed by the plurality of sub-electrodes crossing each other in the mesh shape, and mesh opening parts OA formed between the mesh lines LA. In this case, a line width of the mesh line LA may be in the range of about 0.1 µm to about 10 µm. It may be impossible in terms of the fabrication process to form the mesh line LA having a line width less than about 0.1 µm. When the line width of the mesh line LA exceeds about 10 µm, the sensing electrode pattern may be viewed from an outside so that the visibility may be degraded. The mesh line LA may have a line width in the range of about 1 µm to about 5 µm. Alternatively, the mesh line LA may have a line width in the range of about 1.5 µm to about 3 µm.

The mesh opening part OA may be formed in various shapes. For example, the mesh opening part OA may have various shapes such as a polygonal shape including a rectangular shape, a diamond shape, a pentagon shape or a hexagonal shape, or a circular shape. In addition, the mesh opening part OA may have a regular or random shape.

As the sensing electrode has a mesh shape, the pattern of the sensing electrode may be made not to be viewed in the active area AA. In other words, even when the sensing electrode is formed of metal, the pattern may be made not to be viewed. In addition, even when the sensing electrode is applied to a large-size touch window, the resistance of the touch window may be reduced.

The wire electrode 300 may be connected to the sensing electrode 200. The wire electrode 300 may be disposed on at least one of the active area AA and the unactive area UA of the substrate 100. In detail, the wire electrode 300 may be disposed on the active area AA and the unactive area UA of the substrate 100. That is, the wire electrode 300 may extend from the unactive area UA toward the active area AA of the substrate 100.

The wire electrode 300 may extend toward the unactive area UA to be connected to the printed circuit board 400. In addition, the wire electrode 300 may be disposed on one surface of the substrate 100, on which the first and second sensing electrode 210 and 220 are disposed.

Like the sensing electrode, the wire electrode 300 may be formed in a mesh shape. In addition, the wire electrode 300 may include a material equal to or similar to that of the sensing electrode described above.

The wire electrode 300 may include first and second wire electrodes 310 and 320. In detail, the wire electrode 300 may include the first wire electrode 310 directly or indirectly connected to the sensing electrode 200 and the second wire electrode 320 directly or indirectly connected to the first wire electrode 310. The first or second wire electrode 310 or 320 may have a mesh shape. In detail, at least one of the first and second wire electrodes 310 and 320 may have a mesh shape. In more detail, the first wire electrode 310 may have a mesh shape.

The wire electrode 300 may further include a reinforcement electrode 330. In detail, the wire electrode 300 may further include the reinforcement electrode 330 interposed between the first and second wire electrodes 310 and 320. The reinforcement electrode 330 may be connected to the first and second wire electrodes 310 and 320.

In detail, one end of the first wire electrode 310 may be connected to the sensing electrode 200 and the opposite end of the first wire electrode 320 may be connected to one end of the reinforcement electrode 330. One end of the second wire electrode may be connected to the opposite end of the reinforcement electrode 330 and the opposite end of the second wire electrode may be connected to the printed circuit board 400.

The reinforcement electrode 330 may have a mesh shape. That is, the first wire electrode 310 and the reinforcement electrode 330 may have mesh shapes. In addition, the second wire electrode 320 may be a bulk wire having a constant width.

The first and second wire electrodes 310 and 320 and the reinforcement electrode 330 may be connected to each other and be formed integrally with each other.

At least one of the first and second wire electrodes 310 and 320 and the reinforcement electrode 330 may be disposed on the active area AA or unactive area UA.

Referring to FIG. 2, the first wire electrode 310 and the reinforcement electrode 330 may be disposed on the active area AA and the second wire electrode 320 may be disposed on the unactive area UA.

In addition, the first wire electrode 310, which has a mesh shape and is connected to the sensing electrode 200, may be disposed on the active area AA. The reinforcement electrode 330, which has a mesh shape and is connected to the first wire electrode 310, may be disposed on the active area AA. The second wire electrode 320, which has a bulk shape and is connected to the reinforcement electrode 330, may be disposed on the unactive area UA. The second wire electrode 320 may be connected to the printed circuit board 400 on the unactive area UA.

That is, the first and second wire electrodes 310 and 320 may be connected to each other through the reinforcement electrode 330 disposed on the active area AA.

Figure 3:
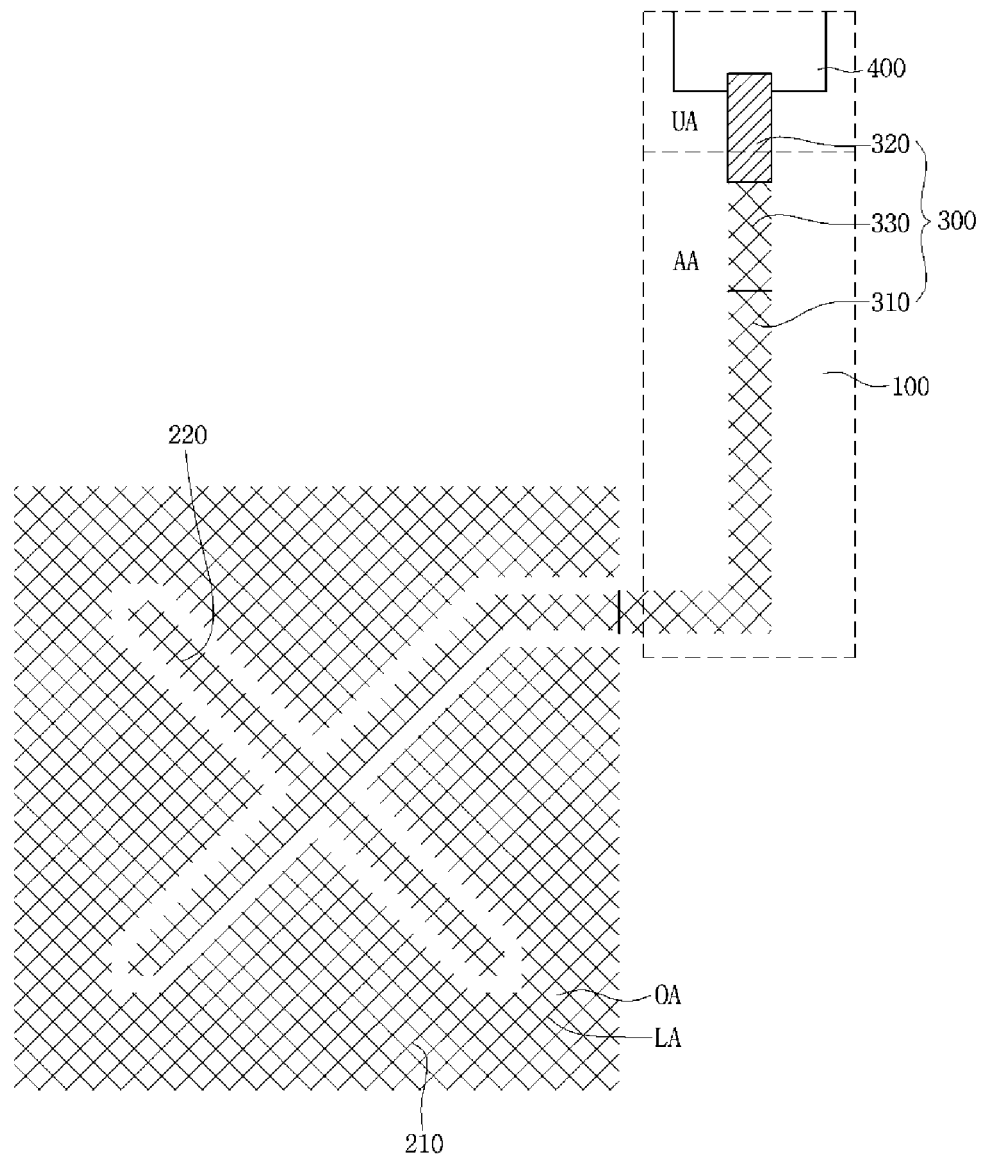

In addition, referring to FIG. 3, the first and second wire electrodes 310 and 320 and the reinforcement electrode 330 may be disposed on the active area AA.

That is, the first and second wire electrodes 310 and 320 may be connected to each other through the reinforcement electrode 330 disposed on the active area AA. Further, the second wire electrode 320 may extend on the active area AA toward the unactive area UA, such that the second wire electrode 320 is connected to the printed circuit board 400.

Figure 4:
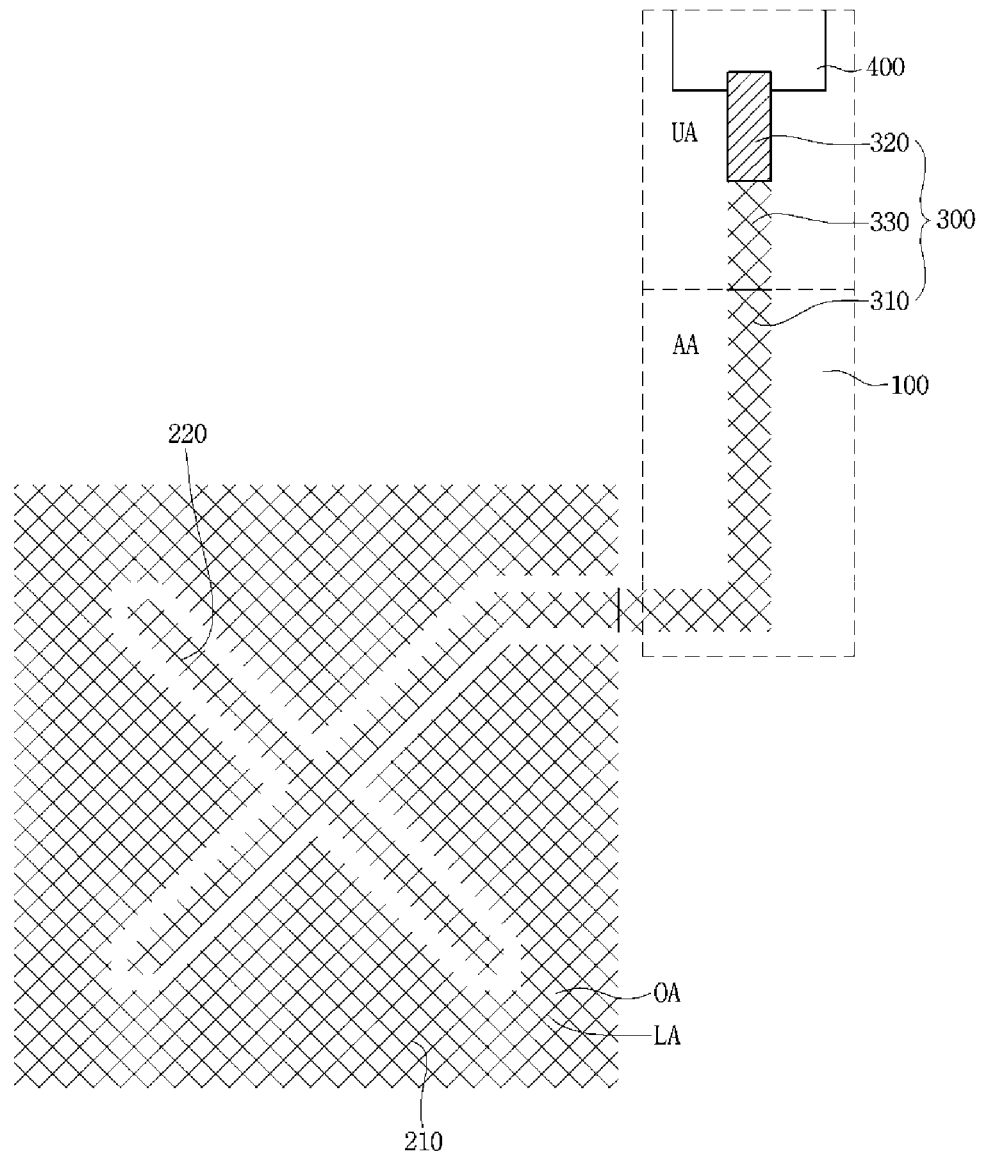

In addition, referring to FIG. 4, the first wire electrode 310 may be disposed on the active area AA, and the second wire electrode 320 and the reinforcement electrode 330 may be disposed on the unactive area UA. The second wire electrode 320 may be connected to the printed circuit board 400 on the unactive area UA.

That is, the first and second wire electrodes 310 and 320 may be connected to each other through the reinforcement electrode 330 disposed on the unactive area UA.

Figure 5:
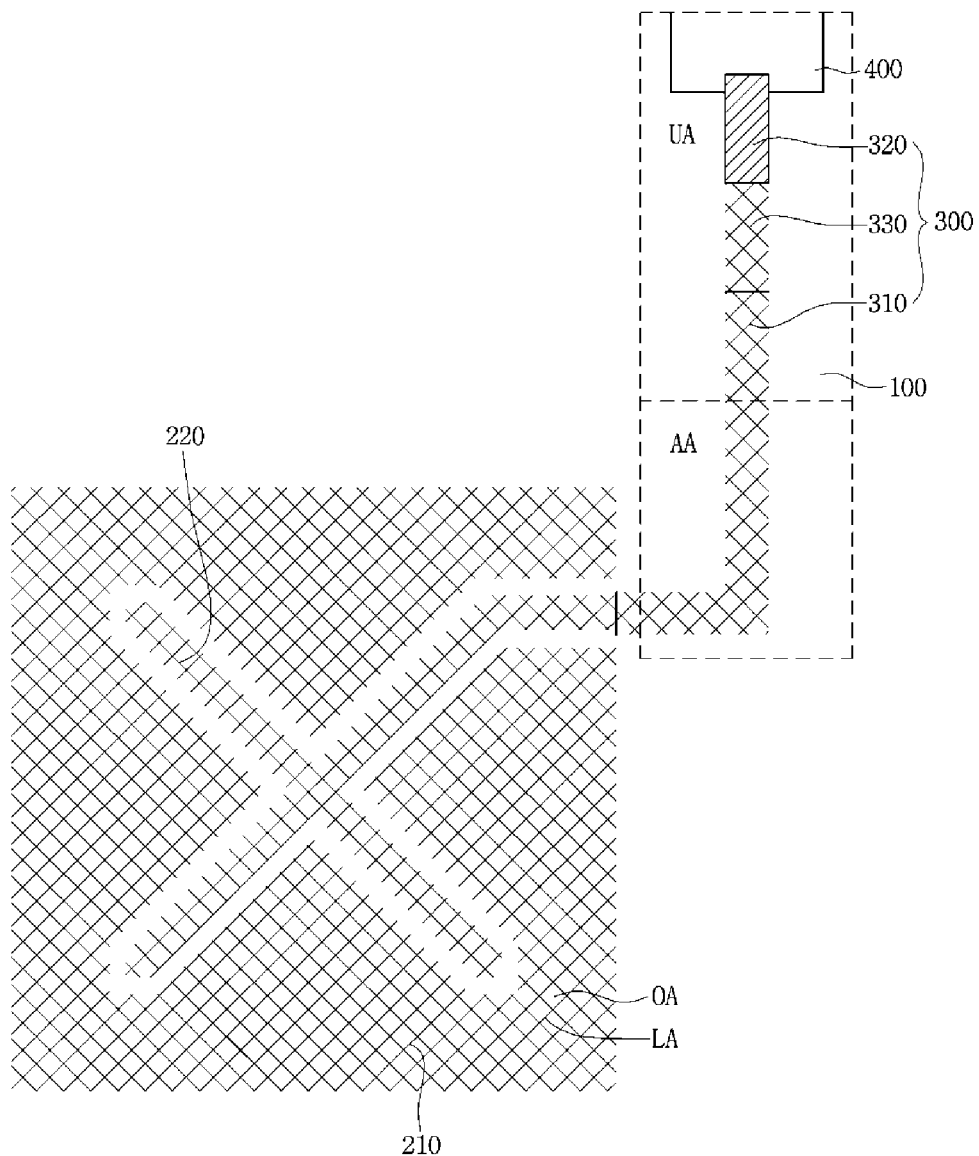

In addition, referring to FIG. 5, the first and second wire electrodes 310 and 320 and the reinforcement electrode 330 may be disposed on the unactive area UA.

That is, the first and second wire electrodes 310 and 320 may be connected to each other through the reinforcement electrode 330 disposed on the unactive area UA. The second wire electrode 320 may be connected to the printed circuit board 400 on the unactive area UA.

Figure 6:
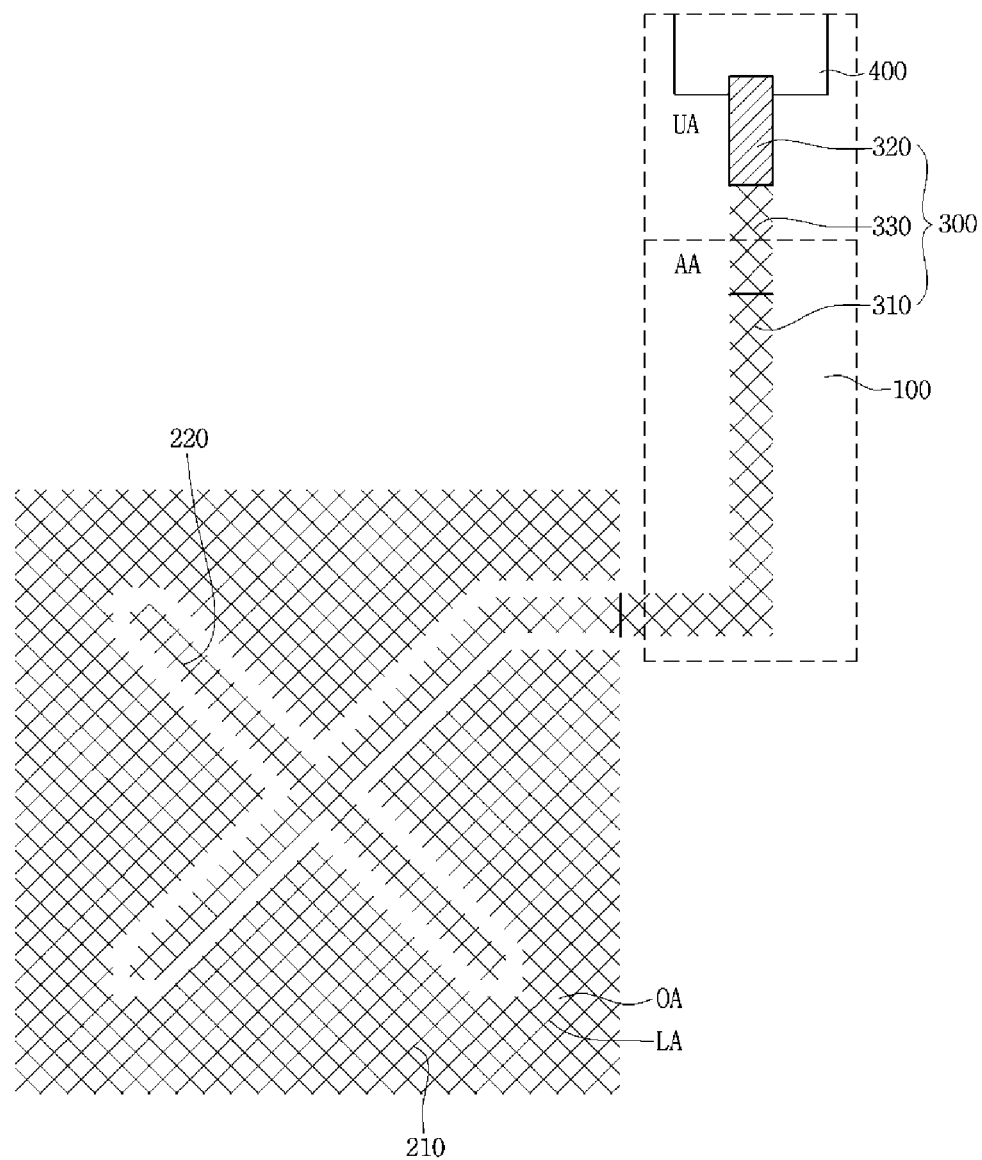

In addition, referring to FIG. 6, the first wire electrode 310 may be disposed on the active area AA. The second wire electrode 320 may be disposed on the unactive area UA. The reinforcement electrode 330 may be disposed on all the active and unactive areas AA and UA.

That is, the first and second wire electrodes 310 and 320 may be connected to each other through the reinforcement electrode 330 disposed on the active and unactive areas AA and UA. The second wire electrode 320 may be connected to the printed circuit board 400 on the unactive area UA.

The first wire electrode 310 and the reinforcement electrode 330 of the touch window in FIGS. 2 to 13 may have mesh shapes.

In detail, the first wire electrode 310 may include a first mesh line and the reinforcement electrode 330 may include a second mesh line. Line widths of the first and second mesh lines LA1 and LA2 may be different from each other. In detail, the line width of the second mesh line LA2 may be wider than that of the first mesh line LA1.

Figure 7:
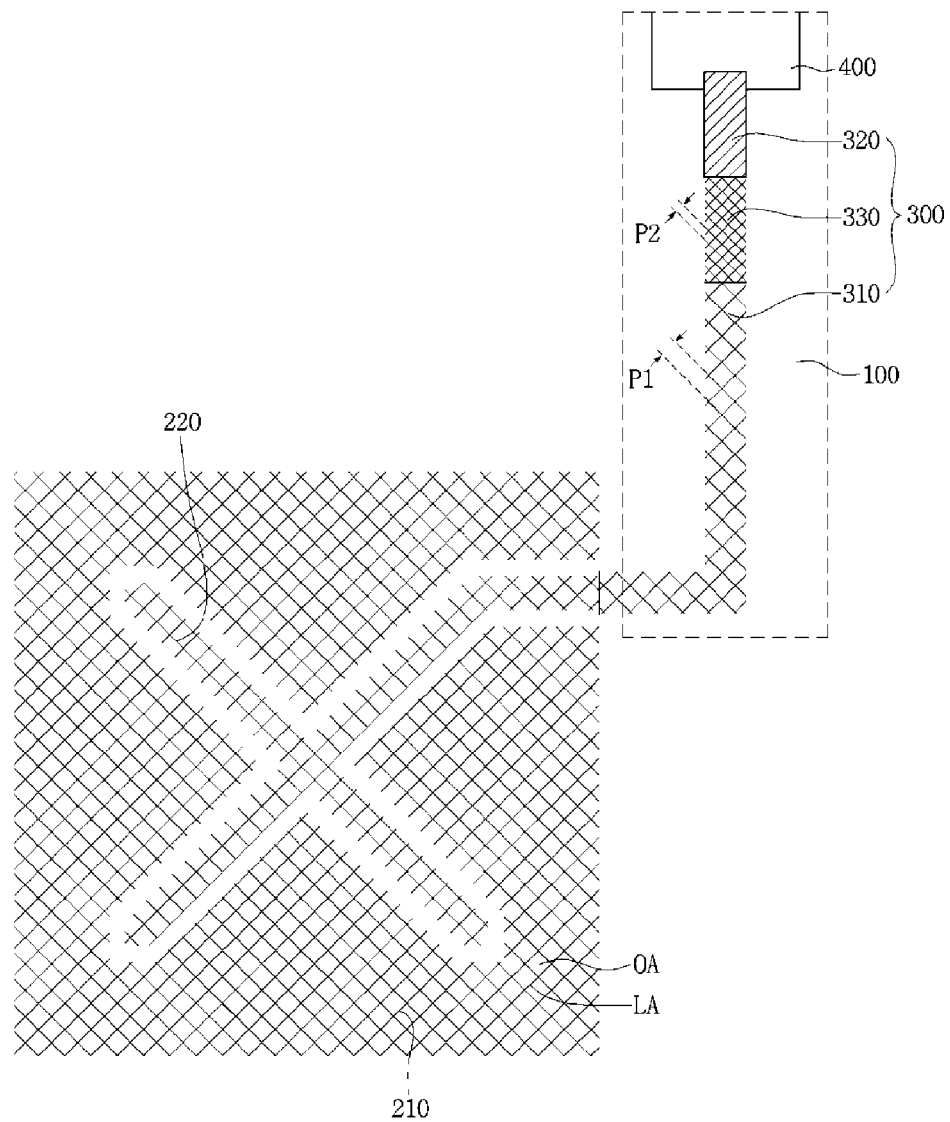

In addition, referring to FIG. 7, the first wire electrode 310 may include the first mesh lines having a first pitch P1. The reinforcement electrode 330 may include the second mesh lines having a second pitch P2.

The first and second pitches P1 and P2 may have mutually different sizes. In detail, the first pitch P1 may be greater than the second pitch P2.

The line width of the second mesh line LA2 may be made to be larger than that of the first mesh line LA1 and the first pitch P1 may be greater than the second pitch P2, so that it may be easy to connect the first wire electrode 310 to the reinforcement electrode 330. The first electrode 310 and the reinforcement electrode 330 may be prevented from being short-circuited with each other by increasing the connection density between the first wire electrode 310 and the reinforcement electrode 330, so that the reliability of the touch window may be improved.

The second wire electrode 320 may be connected to the printed circuit board 400 on the unactive area UA. In detail, when the second wire electrode 320 is disposed on the active area AA, the second wire electrode 320 may extend to the unactive area UA so that the second wire electrode 320 is connected to the printed circuit board 400. When the second wire electrode 320 is disposed on the unactive area UA, the second wire electrode 320 may be connected to the printed circuit board 400 on the unactive area UA.

Figure 8:
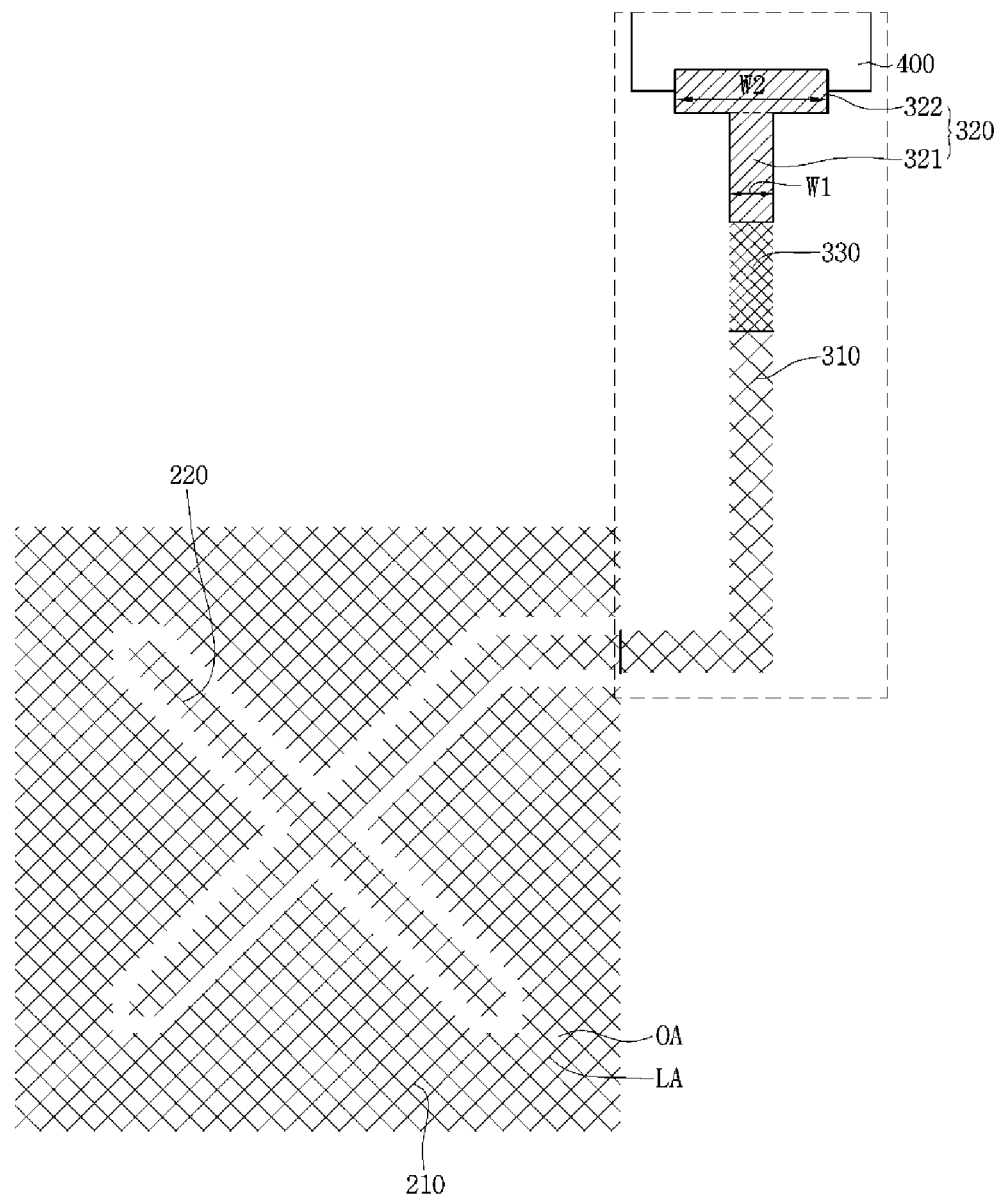

Referring to FIG. 8, the second wire electrode 320 may include first and second sub-second wire electrodes 321 and 322. In detail, the second wire electrode 320 may include the first sub-second wire electrode 321 connected to the reinforcement electrode 330 and the second sub-second wire electrode 322 connected to the printed circuit board 400.

Although the second wire electrode divided into the first and second sub-second wire electrodes has been described for the purpose of convenience of description in FIG. 8, the embodiment is not limited thereto and the first and second sub-second wire electrodes 321 and 322 may be formed integrally with each other.

A width W1 of the first sub-second wire electrode 321 may be different from a width W2 of the second sub-second wire electrode 322. In detail, the width W2 of the second sub-second wire electrode 321 may be wider than the width W1 of the first sub-second wire electrode 322.

That is, a part of the second wire electrode 320 connected to the printed circuit board 400 may have a wider width than other parts of the second wire electrode 320.

Thus, it may be easy to connect the second wire electrode 320 to the printed circuit board 400. In addition the contact area between the second wire electrode 320 and the printed circuit board 400 may be increased, so that the second wire electrode 320 and the printed circuit board 400 are prevented from being short circuited with each other, thereby improving the reliability of the touch window.

Figure 9:
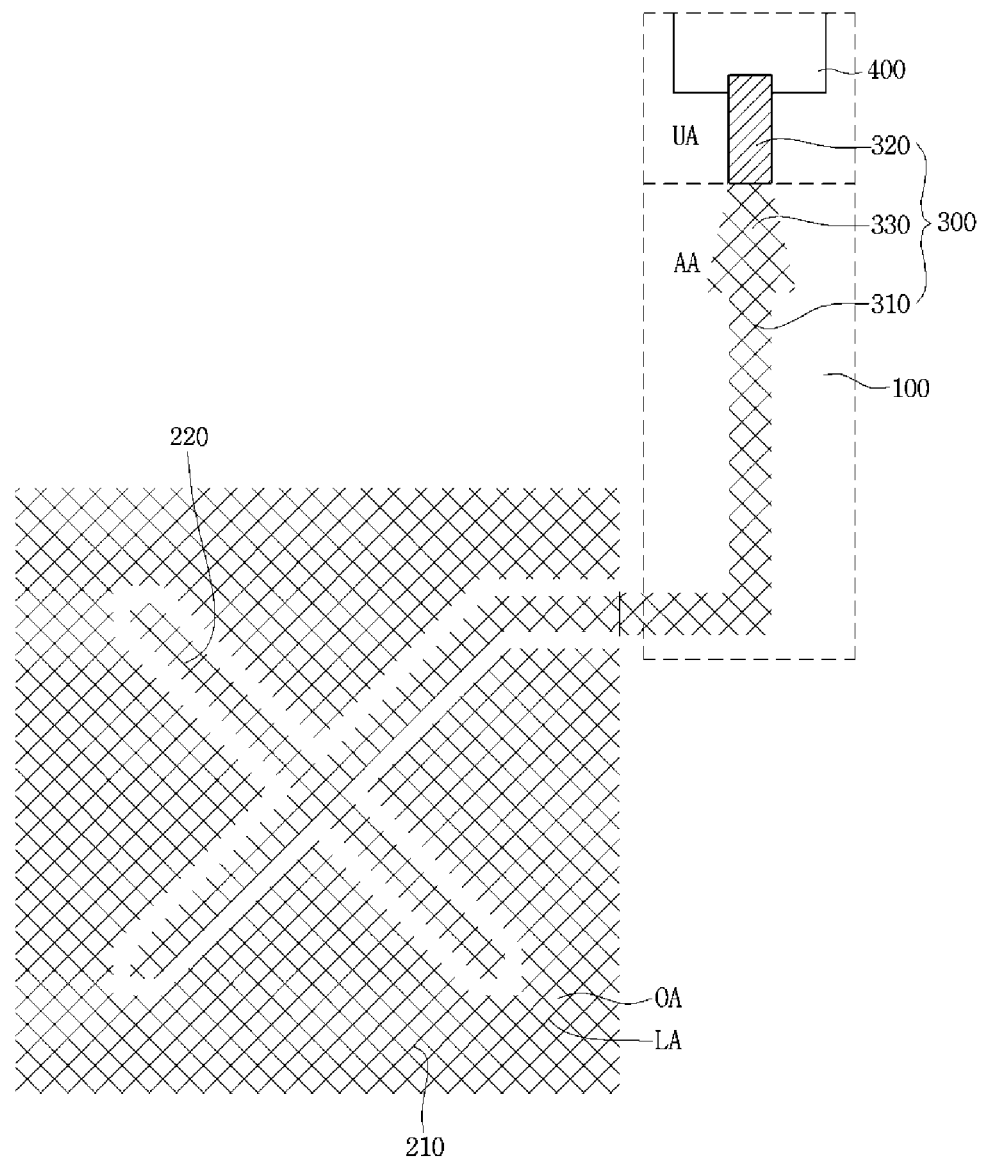

Referring to FIG. 9, the reinforcement electrode 330 may have a width which varies in the direction from one end to the opposite end of the reinforcement electrode 330.

For example, one end of the reinforcement electrode 330 may be connected to the first wire electrode 310, and the opposite end of the reinforcement electrode 330 may be connected to the second wire electrode 320. In addition, the reinforcement electrode 330 may have a width which varies in the direction from one end to the opposite of the reinforcement electrode 300. In detail, the width of the reinforcement electrode 330 may be gradually narrowed as the reinforcement electrode 330 extends from the one end toward the opposite end thereof. That is, the width of the reinforcement electrode 330 may be gradually narrowed as the reinforcement electrode 330 extends from the first wire electrode 310 toward the second wire electrode 320. In other words, the width of the reinforcement electrode 330 may be gradually narrowed as the reinforcement electrode 330 extends from the active area toward the unactive area.

At least one of the first and second wire electrodes 310 and 320 and the reinforcement electrode 330 may have a mesh shape. In detail, the first wire electrode 310 and the reinforcement electrode 330 may have mesh shapes, and the second wire electrode 320 may be a bulk wire.

In addition, the first and second wire electrodes 310 and 320 and the reinforcement electrode 330 may be formed integrally with each other.

In addition, the reinforcement electrode 330 may be disposed on at least one of the active and unactive areas of the substrate 100. The reinforcement electrode 330 may be disposed on the active area of the substrate 100.

In detail, the reinforcement electrode 330 may be disposed on the active area of the substrate 100, and may be connected, on the active area, to the first wire electrode 310 disposed on the active area and the second wire electrode 320 disposed on the unactive area.

Figure 10:
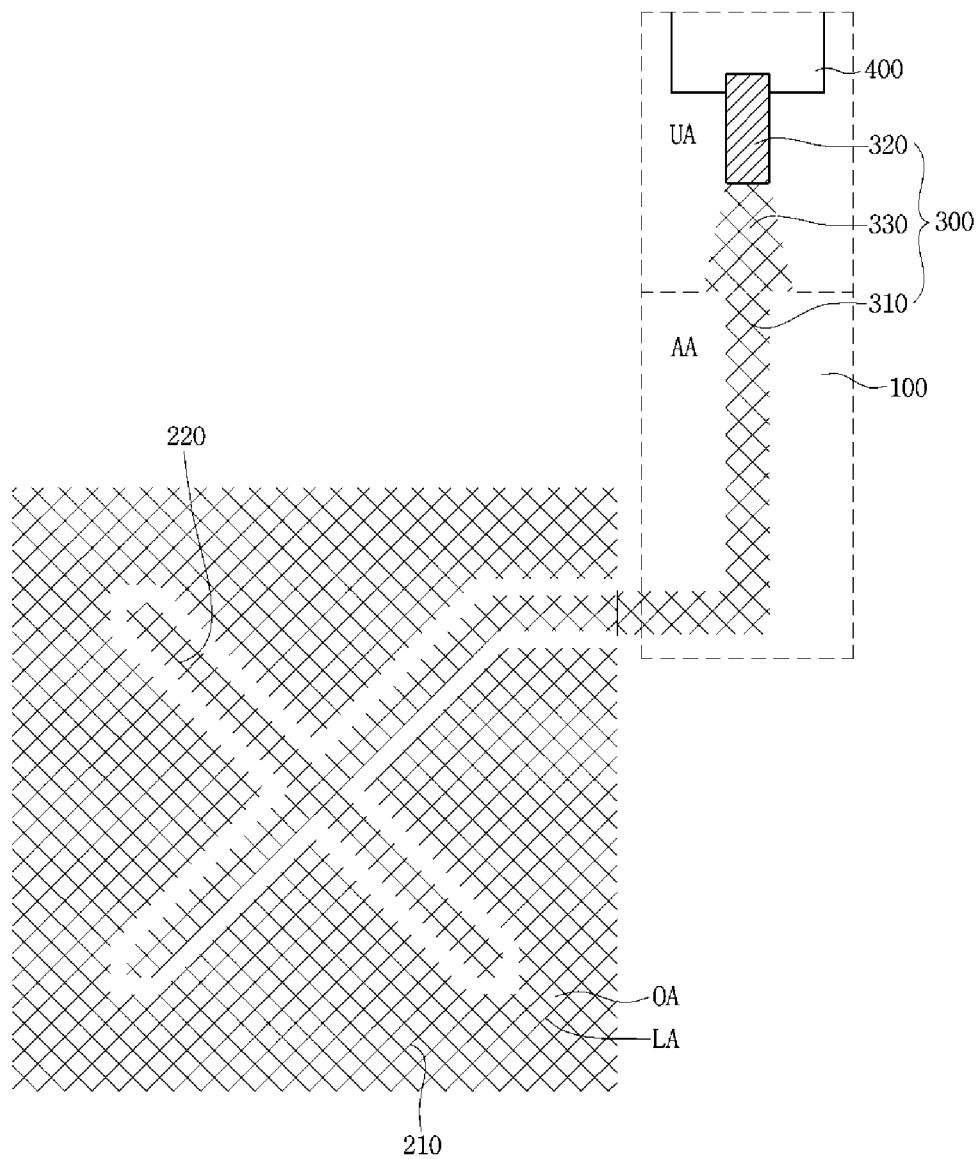

In addition, referring to FIG. 10, the reinforcement electrode 330 may be disposed on the unactive area of the substrate 100.

In detail, the reinforcement electrode 330 may be disposed on the unactive area of the substrate 100 and may be connected, on the unactive area, to the first wire electrode 310 disposed on the active area and the second wire electrode 320 disposed on the unactive area.

Figure 11:
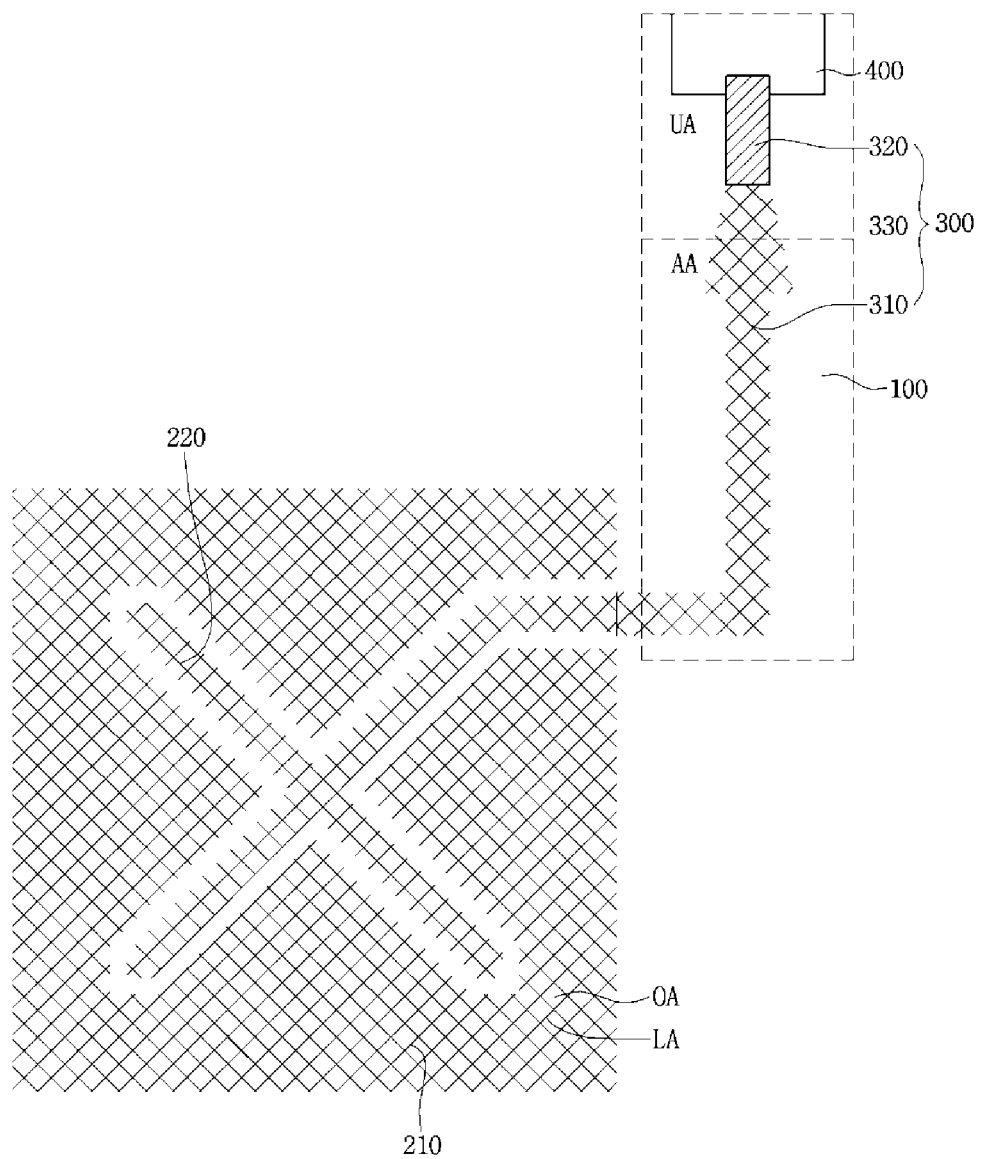

In addition, referring to FIG. 11, the reinforcement electrode 330 may be disposed on the active and unactive areas of the substrate 100.

In detail, the reinforcement electrode 330 may be disposed on the active and unactive areas of the substrate 100, and may be connected, on the active area, to the first wire electrode 310 disposed on the active area and the second wire electrode 320 disposed on the unactive area.

That is, the touch window according to the embodiment may include the reinforcement electrode which connects the first wire electrode disposed on the active area to the second wire electrode disposed on the unactive area. In addition, a part at which the first sub-wire electrode is connected to the reinforcement electrode may be formed to have a wide width.

Thus, it may be easy to connect the wire electrode having a mesh shape to the wire electrode having a bulk shape. In addition, the wire electrodes may be prevented from being short-circuited with each other by increasing the contact area, so that the reliability of the touch window may be improved.

Figure 12:
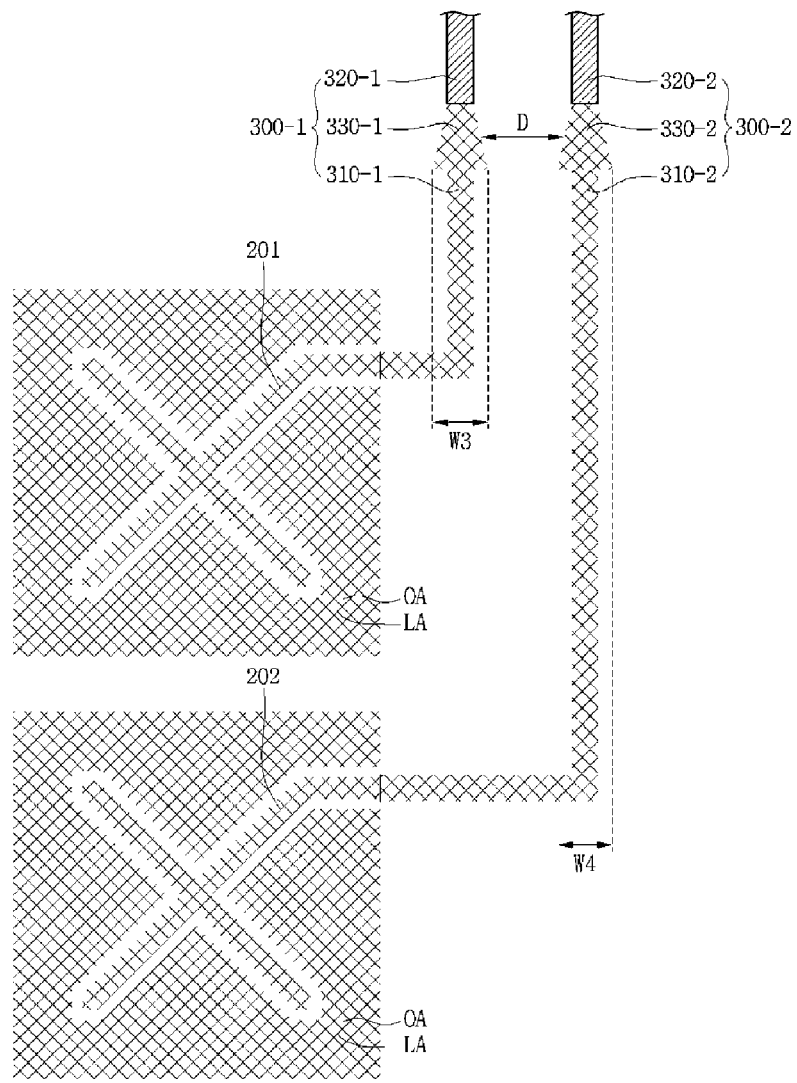

Referring to FIG. 12, the reinforcement electrodes, which connect the wire electrodes to each other, respectively, may be spaced apart from each other.

For example, the sensing electrode 200 may include the first and second sub-sensing electrodes 201 and 202 spaced apart from each other. In addition, the wire electrode 300 may include a wire electrode 300-1 of the first sub-sensing electrode connected to the first sub-sensing electrode 201 and a wire electrode 300-2 of the second sub-sensing electrode connected to the second sub-sensing electrode 202.

The wire electrode 300-1 of the first sub-sensing electrode may include a fifth wire electrode 310-1 disposed on the active area AA, a sixth wire electrode 320-1 disposed on the unactive area UA, and a first reinforcement electrode 330-1 for connecting the fifth and sixth wire electrodes 310-1 and 320-1 to each other.

The wire electrode 300-2 of the second sub-sensing electrode may include a seventh wire electrode 310-2 disposed on the active area AA, an eighth wire electrode 320-2 disposed on the unactive area UA, and a second reinforcement electrode 330-2 for connecting the seventh and eighth wire electrodes 310-2 and 320-2 to each other.

The first and second reinforcement electrodes 330-1 and 330-2 may be spaced apart from each other. For example, the first and second reinforcement electrodes 330-1 and 330-2 may be spaced apart from each other on at least one of the active and unactive areas AA and UA.

A constant ratio may be set between at least one of the widths W3 and W4 of the first and second reinforcement electrodes 330-1 and 330-2 and a spaced distance D between the first and second reinforcement electrodes 330-1 and 330-2. For example, the ratio between at least one of the widths W3 and W4 of the first and second reinforcement electrodes 330-1 and 330-2 and the spaced distance D between the first and second reinforcement electrodes 330-1 and 330-2 may be in the range of about 1:1 to about 1:1.5.

That is, the spaced distance between the first and second reinforcement electrodes 330-1 and 330-2 may be shorter than at least one of the widths W3 and W4 of the first and second reinforcement electrodes 330-1 and 330-2, and the ratio of the size thereof may be in the range of about 1:1 to about 10:1.

According to the touch window of the embodiment, etchant solution may be smoothly coated when the wire electrode is formed by controlling the ratio between the width of the reinforcement wire and the spaced distance between the reinforcement wires, so that the etching may be precisely performed, thereby reducing a residual metal layer which may be generated due to an etching error.

Therefore, according to the touch window of the embodiment, the wire electrodes may be prevented from being short-circuited with each other or the sensing electrode by reducing the residual metal layer generated due to the etching error, so that the entire reliability of the touch window may be improved.

Figure 13:
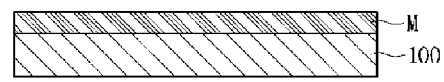
FIGS. 13 to 15 are views illustrating a process of forming a sensing electrode and/or a wire electrode according to an embodiment.
Figure 13:
Figure 13:
Figure 14:
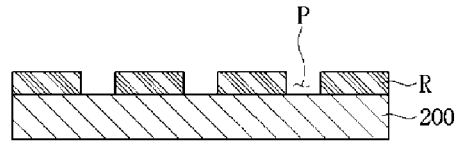
Figure 14:
Figure 14:
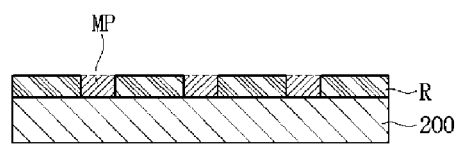
Figure 15:
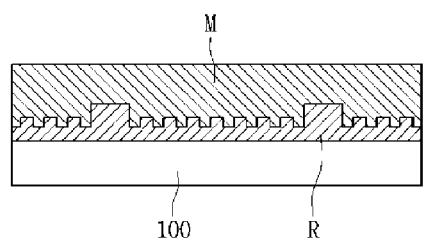
Figure 15:
Figure 15:
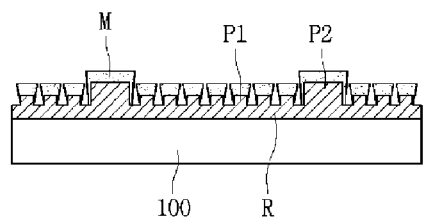
Figure 15:
Figure 15:
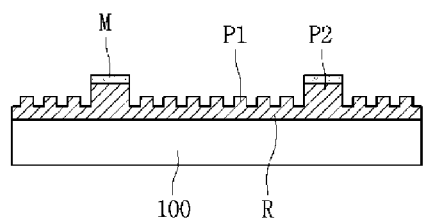

FIGS. 13 to 15 are views illustrating a process of forming a sensing electrode and/or a wire electrode according to an embodiment.

Referring to FIG. 13, the sensing electrode and/or the wire electrode may be formed in a mesh shape by etching a metal layer after the metal layer M is disposed on the entire surface of the substrate 100. For example, after a metal M such as Cu is deposited on the entire surface of the substrate 100 including polyethylene terephthalate to form a Cu layer, a convex Cu mesh electrode having a mesh shape may be formed by etching the Cu layer.

In addition, referring to FIG. 14, according to the sensing electrode and/or the wire electrode of the embodiment, after a resin layer R including UV or thermosetting resin is disposed on the substrate 100 and a concave pattern P having a mesh shape is formed on the resin layer R, the concave pattern may be filled with metallic paste MP. In this case, the concave pattern of the resin layer may be formed by imprinting the resin layer with a mold having a convex pattern.

The metallic paste MP may include at least one of Cr, Ni, Cu, Al, Ag, Mo and the alloy thereof. When the metallic paste is filled into the concave pattern P having the mesh shape and then, is hardened, the convex metal mesh electrode may be formed.

In addition, referring to FIG. 15, according to the sensing electrode and/or the wire electrode of the embodiment, after a resin layer including UV or thermosetting resin is disposed on the substrate 100, and a convex nano-pattern and a micro-pattern having a mesh shape are formed on the resin layer R, a metal layer M including at least one of Cr, Ni, Cu, Al, Ag, Mo and the alloy thereof may be formed on the resin layer through a sputtering scheme.

In this case, the convex pattern of the nano-pattern and micro-pattern may be formed by imprinting the resin layer with a mold having a corresponding concave pattern.

*122 Then, the metal layer formed on the nano-pattern and micro-pattern is etched to remove only the metal layer on the nano-pattern and allow the metal layer on the micro-pattern to remain, so that the metal electrode having the mesh shape may be formed.

In this case, when the metal layer is etched, a difference between the etching rates may occur due to a difference between the junction area of the nano-pattern P1 and the metal layer and the junction area of the micro-pattern P2 and the metal layer. That is, since the junction area of the micro-pattern and the metal layer is larger than the junction area of the nano-pattern and the metal layer, the electrode material on the micro-pattern is less etched, so that the metal layer on the micro-pattern remains and the metal layer on the nano-pattern P1 is removed by the same etching rate. Thus, the metal electrode having a convex mesh shape corresponding to the micro-pattern may be formed on the substrate 100.

Differently from the above, although not shown, the sensing electrode or the wire electrode may be formed by coating nanowires on a base material after the base material is disposed on the substrate 100.

The sensing electrode and/or wire electrode of the touch window according to the embodiment may be prepared as a mesh-shaped electrode including a metal layer as shown in FIGS. 13 to 15 described above.

According to the touch window of the embodiment, the wire electrode having the mesh shape and the wire electrode having the bulk shape may be connected to each other through the reinforcement electrode disposed on at least one of the active and unactive areas.

Thus, the wire electrode having the mesh shape and the wire electrode having the bulk shape may be easily connected to each other, so that the contact area is increased, thereby preventing the wire electrodes from being short-circuited with each other.

In addition, the reinforcement electrode is formed in the mesh shape and to have the line width and pitch different from those of the wire electrode having the mesh shape, so that the wire electrode having the mesh shape and the reinforcement electrode may be easily connected to each other and the contact number of the mesh lines may be increased, thereby preventing the wire electrodes from being short-circuited with each other.

Therefore, the touch window according to the embodiment may have improved reliability.

Each of the touch windows according to the embodiments described above may be combined with a driving unit to constitute a touch device. That is, each of the touch windows according to the embodiments may be coupled to a driving unit including a display panel to be applied to a touch device.

The driving unit may include a light module and a liquid crystal panel.

The light module may include a light source emitting light toward the liquid crystal panel. For example, the light source may include a light emitting diode (LED) or an organic light emitting diode (OLED).

The liquid crystal panel may include a plurality of liquid crystal elements. The molecular arrangement of the liquid crystal elements may be changed as an electrical signal is applied thereto from an outside so that the liquid crystal elements may have directionality of a predetermined pattern.

The driving unit may allow the lights radiated from the light module and passing through the liquid panel to be refracted in mutually different patterns.

In addition, the driving part may further include a polarizing filter and a color filter disposed on the liquid crystal panel.

The touch window may be disposed on the driving unit. In detail, the touch window may be disposed on the driving unit while being received in a cover case, the touch. The touch window may adhere to the driving unit. In detail, the touch panel and the driving unit may adhere to each other through optical clear adhesive (OCA).

Hereinafter, various types of touch windows according to embodiments will be described with reference to FIGS. 16 to 19.

Figure 16:
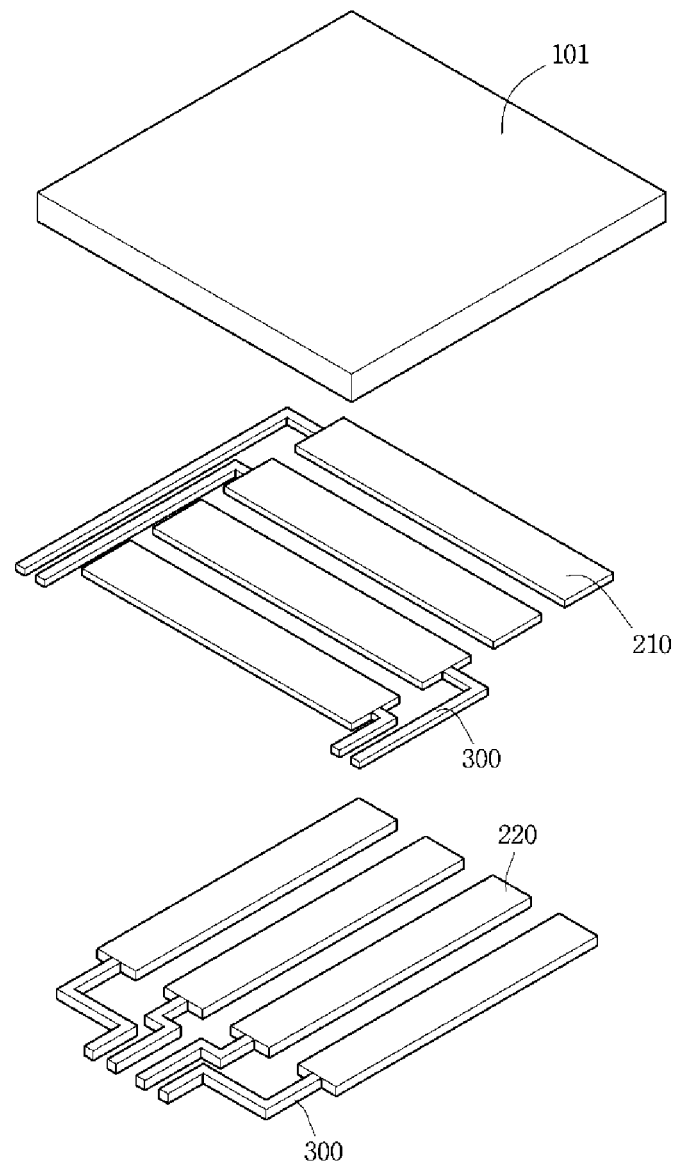
FIGS. 16 to 19 are perspective views showing various structures of a touch window according to embodiments.

Referring to FIG. 16, the touch window according to an embodiment may include a cover substrate 101. In addition, first and second sensing electrodes 210 and 220 may be disposed on the cover substrate 101.

For example, the first and second sensing electrodes 210 and 220 may be disposed on one surface of the cover substrate 101. In detail, the first and second sensing electrodes 210 and 220 may be disposed on the same surface of the cover substrate 101.

The first and second sensing electrode 210 and 220 which extend in opposite directions to each other and wire electrodes 300 which are connected to the first and second sensing electrodes 210 and 220, respectively are disposed on the same surface of the cover substrate 101. The first and second sensing electrodes 210 and 220 may be disposed on the same surface of the cover substrate 101 while being spaced apart and insulated from each other. That is, the first sensing electrode 210 may extend in one direction and the second sensing electrode 220 may extend in the opposite direction.

Figure 17:
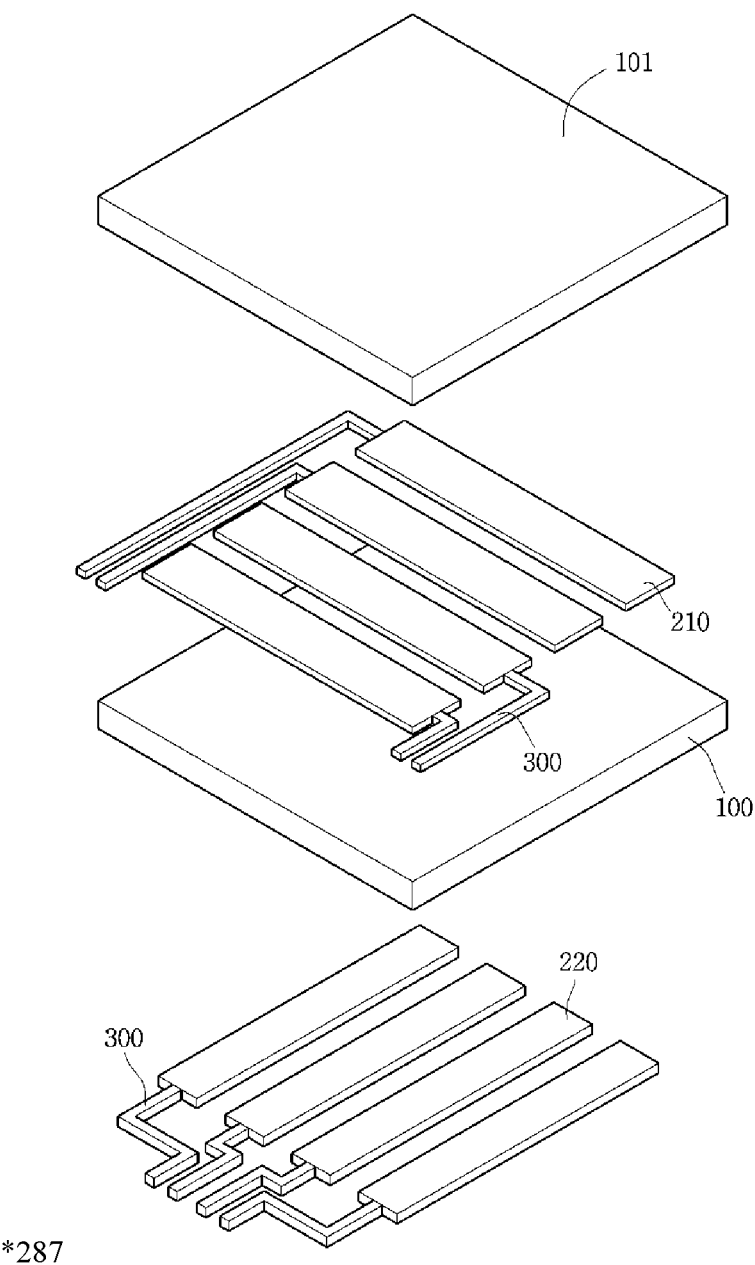

Referring to FIG. 17, the touch window according to an embodiment may include a cover substrate 101 and a substrate 100 on the cover substrate 101.

In addition, a first sensing electrode 210 may be disposed on the cover substrate 101 and a second sensing electrode 220 may be disposed on the substrate 100. The substrate 100 may include a material equal or similar to the cover substrate 101.

In detail, the first sensing electrode 210 extending in one direction and the wire electrode 300 connected to the first sensing electrode 210 may be disposed on one surface of the cover substrate 101. The second sensing electrode 220 extending in a direction different from the extending direction of the first sensing electrode 210 and the wire electrode 300 connected to the second sensing electrode 220 may be disposed on one surface of the substrate 100.

In addition, all the first and second sensing electrodes 210 and 220 may be disposed on the substrate 100. For example, the first sensing electrode 210 may be disposed on one surface of the substrate 100 and the second sensing electrode 220 may be disposed on the opposite surface to the one surface of the substrate 100.

Figure 18:
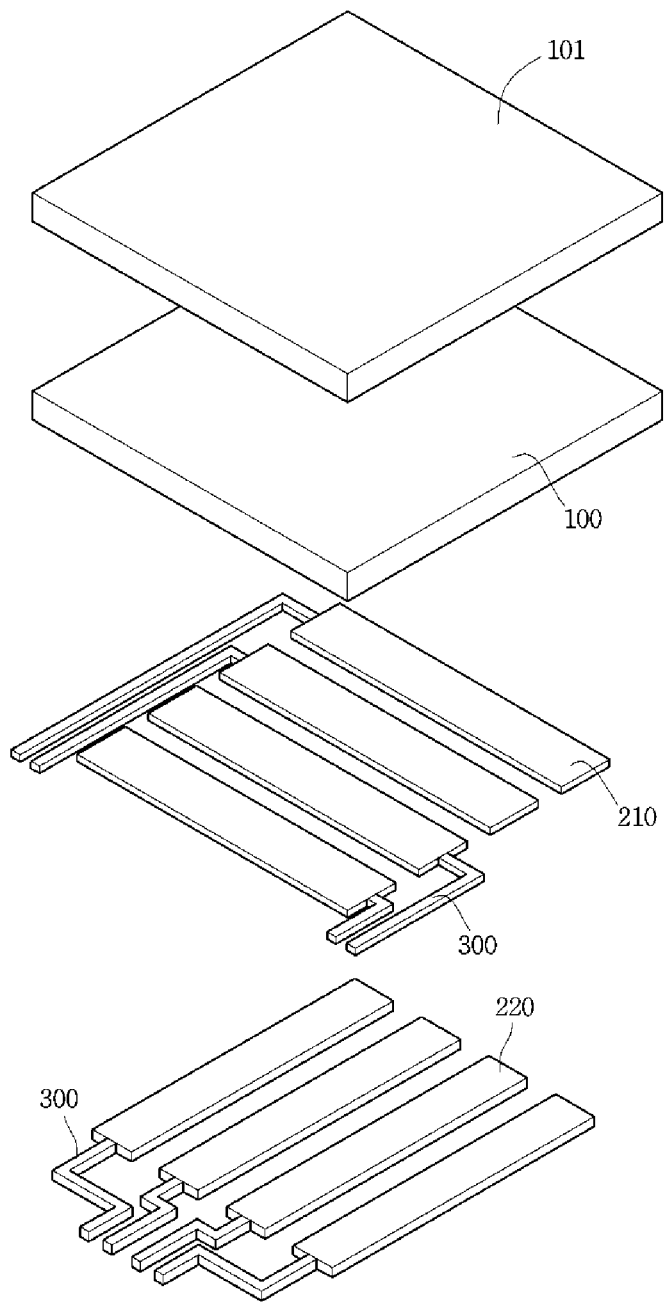

Referring to FIG. 18, the touch window according to an embodiment may include a cover substrate 101 and a substrate 100 on the cover substrate 101.

In addition, first and second sensing electrodes 210 and 220 may be disposed on the substrate 100.

For example, the first and second sensing electrodes 210 and 220 may be disposed on one surface of the substrate 100. In detail, the first and second electrodes 210 and 220 may be disposed on the same surface of the substrate 100.

The first and second sensing electrodes 210 and 220 which extend in mutually different directions and wire electrodes 300 which are connected to the first and second sensing electrodes 210 and 220, respectively may be disposed on the same surface of the substrate 100. The first and second sensing electrodes 210 and 220 may be disposed on the same surface of the substrate 100 while being insulated from each other. That is, the first sensing electrode 210 may extend in one direction and the second sensing electrode 220 may extend in a direction different from the one direction.

Figure 19:
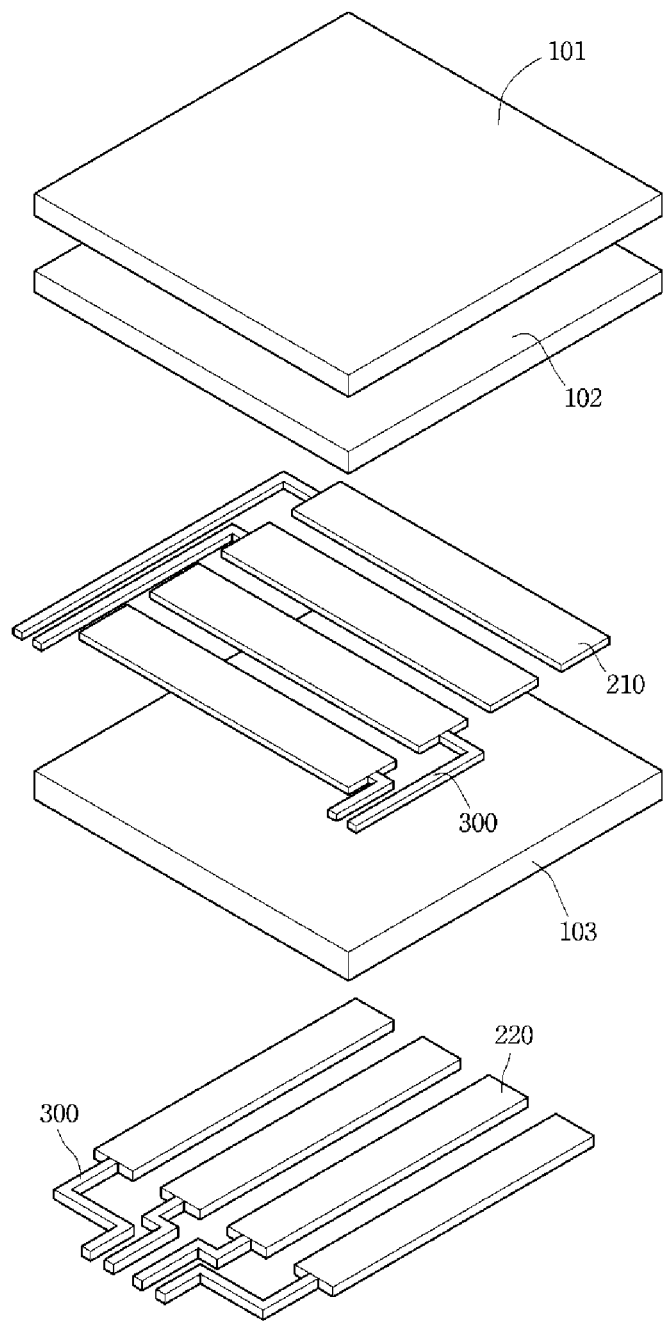

Referring to FIG. 19, the touch window according to an embodiment may include a cover substrate 101, a first substrate 102 on the cover substrate 101, and a second substrate 103 on the first substrate 102.

In addition, a first sensing electrode 210 may be disposed on the first substrate 102 and a second sensing electrode 220 may be disposed on the second substrate 103.

In detail, the first sensing electrode 210 extending in one direction and a wire electrode 300 connected to the first sensing electrode 210 may be disposed on one surface of the first substrate 102. The second electrode 220 extending in a direction different from the first sensing electrode 210 and a wire electrode 300 connected to the second sensing electrode 220 may be disposed on one surface of the second substrate 103.

Hereinafter, a touch window according to another embodiment will be described with reference to FIGS. 20 to 27. The description about the elements and structures that have been described in the previous embodiment will be omitted.

Referring to FIGS. 20 to 27, the touch window according to another embodiment may include a substrate 100, a sensing electrode 200 and a wire electrode 300. First, the substrate 100 may have an active area AA and an unactive area UA defined therein.

The unactive area UA may be disposed on one side surface of the active area AA. For example, the unactive area UA may be disposed on only both side surfaces of the active area AA. In detail, the unactive area UA may be disposed on a top end and/or a bottom end of the active area AA. That is, the unactive area UA may not be disposed on left and right surfaces of the active area AA.

In detail, the sensing electrode 200 may be prepared as a single layer. The wire electrode 300 extending from the sensing electrode 200 may be disposed on the unactive area UA located at the top end and/or bottom end of the active area AA.

Thus, the active area, which is the display area of a touch window, may be maximized. In addition, it is possible to overcome the limitation of design due to a bezel including the unactive area UA.

A printed layer may be disposed on the unactive area UA. The printed layer may be formed by coating a material having a predetermined color, such that the wire electrode 300 or printed circuit board disposed on the unactive area is not viewed from an outside. The printed layer may have a color suitable for a desired appearance. For example, the printed layer may include black pigment to be black. In addition, a desired logo may be formed on the printed layer through various schemes. Such a printed layer may be formed through a deposition, printing or wet-coating scheme.

The sensing electrode may be disposed on the substrate 100.

The touch window according to an embodiment may directly sense the variation of capacitance induced between the sensing electrode and a conductor, so that the touch sensitivity may be improved and it is possible to implement proximity sensing.

Figure 20:
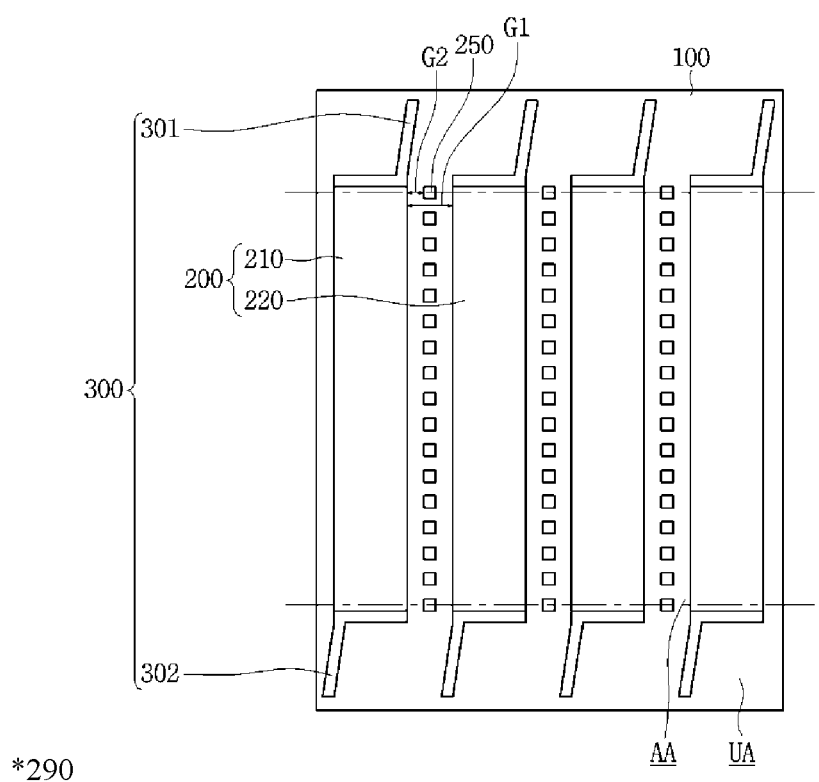
FIG. 20 is a plan view showing a touch window according to another embodiment.

Referring to FIG. 20, the sensing electrode 200 according to the embodiment may be disposed on the substrate 100. In detail, the sensing electrode 200 may be disposed on at least one of the active and unactive areas AA and UA. Preferably, the sensing electrode may be disposed on the active area AA.

The sensing electrode 200 may have a structure in which a plurality of electrode patterns are arranged. That is, the sensing electrode 200 may include first and second sensing electrodes 210 and 220. In detail, the plurality of first sensing electrodes 210 and the plurality of second sensing electrodes 220 may be alternately disposed side to side on one surface of the substrate 100. For example, the first and second electrodes 210 and 220 may have a bar shape. The first and second electrodes 210 and 220 may be alternated from side to side on the same surface of the substrate 100 while being spaced apart from each other by a predetermined interval to make non-contact with each other. Although the sensing electrode 200 having a bar shape is depicted in FIGS. 2 to 5, the embodiment is not limited thereto. That is, the sensing electrode 200 may be formed in various shapes capable of sensing whether the sensing electrode 200 is touched by an input device such as a finger.

A width of the sensing electrode 200 may correspond to a size of a touch object (for example, a finger). For example, since the radius of a finger of a general person is equal to about 6 mm, the width of the sensing electrode may be in the range of 8 mm to 16 mm. In detail, the width of the sensing electrode 200 may be in the range of 9 mm to 14 mm. In more detail, the width of the sensing electrode 200 may be equal to about 12 mm corresponding to the diameter of a finger. That is, the width of the sensing electrode 200 is formed to approximately correspond to the size of a finger, so that the touch sensitivity may be improved.

When the touch window of the embodiment is touched, the touch position may be determined by comparing a signal varied according to the values of resistance and capacitance formed in the sensing electrode 200 with a reference signal. In detail, the reference signal may cross the sensing electrode 200 through a uniform resistance design in the sensing electrode 200. In other words, the reference signal may cross each of the first and second sensing electrodes 210 and 220 due to uniform resistance. When a touch occurs, a voltage variation occurs due to the capacitance formed between a touch object and the sensing electrode 200. In this case, the voltage variation with time is calculated, such that the touch position may be calculated. That is, a time difference for time response is made according to the voltage variation. Thus, the touch position may be recognized by comparing the changed signal with the reference signal.

That is, when viewed from the top, the touch position in the longitudinal direction (hereinafter, referred to as "vertical direction") of the sensing electrode 200 may be recognized by comparing the changed signal with the reference signal. In addition, the touch position in the horizontal direction perpendicular to the vertical direction may be recognized based on the touch position of the sensing electrode 200 outputting the changed signal.

At least one sensing electrode 200 of the first and second sensing electrodes 210 and 220 may include a transparent conductive material that allows electricity to flow therethrough without interrupting transmission of light. For example, the sensing electrode 200 may include metal oxide such as indium tin oxide (ITO), indium zinc oxide (IZO), copper oxide, tin oxide, zinc oxide, or titanium oxide.

In addition, the sensing electrode 200 may include a nanowire, a photo sensitive nanowire film, a carbon nanotube (CNT), grapheme or conductive polymer.

In addition, the sensing electrode 200 may include various metals. For example, the sensing electrode 200 may include at least one of Cr, Ni, Cu, Al, Ag, Mo and the alloy thereof.

At least one sensing electrode 200 of the first and second sensing electrodes 210 and 220 may be formed in a mesh shape. In detail, at least one sensing electrode 200 of the first and second sensing electrodes 210 and 220 may include a plurality of sub-electrodes. The sub-electrodes may be disposed in a mesh shape while crossing each other.

Figure 21:
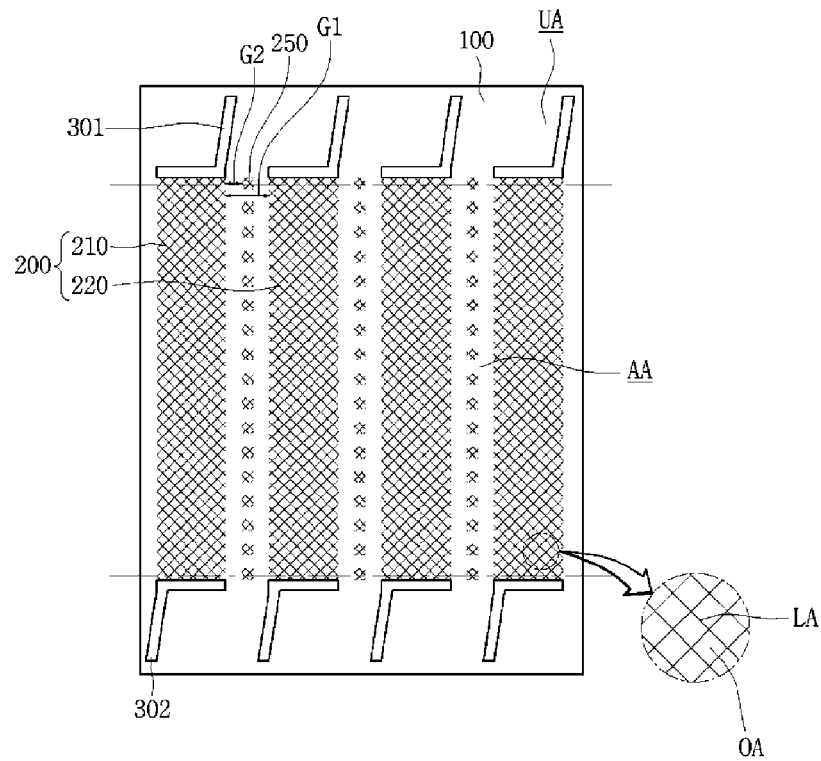
FIGS. 21 to 25 are plan views showing touch windows according to various embodiments.

In detail, referring to FIG. 21, at least one sensing electrode 200 of the first and second sensing electrodes 210 and 220 may include mesh lines LA formed by the plurality of sub-electrodes crossing each other in the mesh shape, and mesh opening parts OA formed between the mesh lines LA. In this case, a line width of the mesh line LA may be in the range of about 0.1 µm to about 10 µm. It may be impossible in terms of the fabrication process to form the mesh line LA having a line width less than about 0.1 µm. When the line width of the mesh line LA exceeds about 10 µm, the pattern of the sensing electrode 200 may be viewed from an outside so that the visibility may be degraded. The mesh line LA may have a line width in the range of about 1 µm to about 5 µm. Alternatively, the mesh line LA may have a line width in the range of about 1.5 µm to about 3 µm.

The mesh opening part OA may be formed in various shapes. For example, the mesh opening part OA may have various shapes such as a polygonal shape including a rectangular shape, a diamond shape, a pentagon shape or a hexagonal shape, or a circular shape. In addition, the mesh opening part OA may have a regular or random shape.

As the sensing electrode 200 has a mesh shape, the pattern of the sensing electrode may be made not to be viewed in the active area AA. In other words, even when the sensing electrode 200 is formed of metal, the pattern may be made not to be viewed. In addition, even when the sensing electrode 200 is applied to a large-size touch window, the resistance of the touch window may be reduced.

Meanwhile, as the gap G1 between the first and second sensing electrodes 210 and 220 is increased, the visibility of the touch window may be degraded. In detail, when the gap G1 between the first and second sensing electrodes 210 and 220 exceeds 150 µm, the visibility of the sensing electrode 200 may be rapidly degraded. To the contrary, when the gap G1 between the first and second sensing electrodes 210 and 220 is narrowed, the sensing electrodes 200 may be short-circuited with each other due to foreign substances. In addition, when the sensing electrodes 200 are arranged by a narrow gap G1, the cost may be increased unnecessarily.

In the touch window according to the embodiment, in order to enlarge the gap G1 between the sensing electrodes 200, a dummy part 250 may be disposed in the gap G1 between the sensing electrodes 200. In detail, the dummy part 250 may be disposed between the first and second sensing electrodes 210 and 220. The dummy part 250 may include the same material as the sensing electrode 200. Thus, the optical characteristics and visibility of the touch window may be improved through the dummy part 250.

Since the visibility is improved due to the disposition of the dummy part 250, the gap G1 between the sensing electrodes 200 may be increased. In detail, the gap G1 between the sensing electrodes 200 may correspond to a width of the sensing electrode 200. For example, the gap G1 between the first and second sensing electrodes 210 and 220 may be in the range of 150 µm to 16 mm. In detail, the gap G1 between the first and second sensing electrodes 210 and 220 may be in the range of 500 µm to 12 mm. In more detail, the gap G1 between the first and second sensing electrodes 210 and 220 may be in the range of 1 mm to 10 mm. When the gap G1 between the sensing electrodes 200 is less than 150 µm, the sensing electrodes 200 may be short-circuited with each other due to foreign substances. If the gap G1 between the sensing electrodes 200 exceeds 16 mm, when the gap G1 between the sensing electrodes 200 is touched, the touch sensibility may be degraded.

According to the embodiment, the dummy part 250 may include a plurality of patterns. In addition, the pattern may have various shapes such as a polygonal shape including a rectangular shape, a diamond shape, a pentagon shape or a hexagonal shape, or a circular shape.

As shown in FIGS. 20 and 21, the dummy part 250 may include the plural patterns arranged between the sensing electrodes 200 in at least one row. Alternatively, referring to FIG. 22, the dummy part 250 may include the plural patterns arranged in at least two rows. When the plural patterns are arranged in at least two rows, the electrical short caused by foreign substances may be more suppressed.

Figure 22:
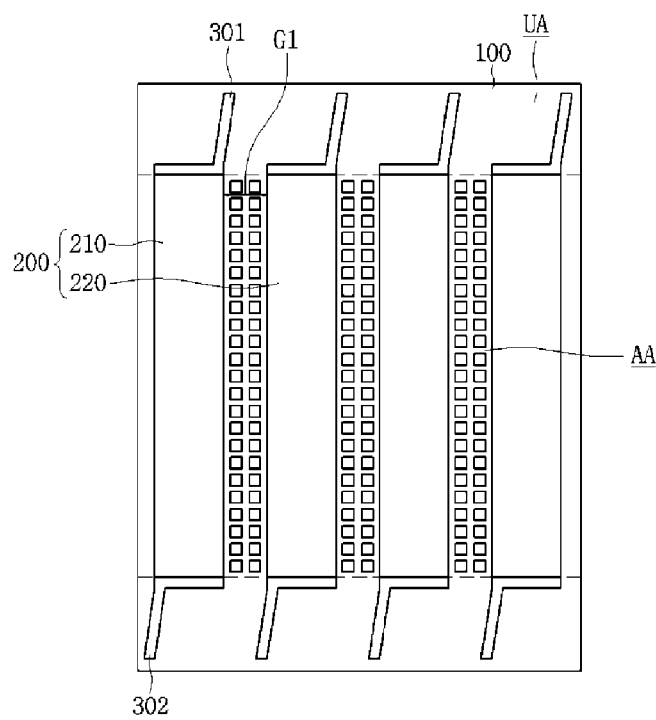
Figure 23:
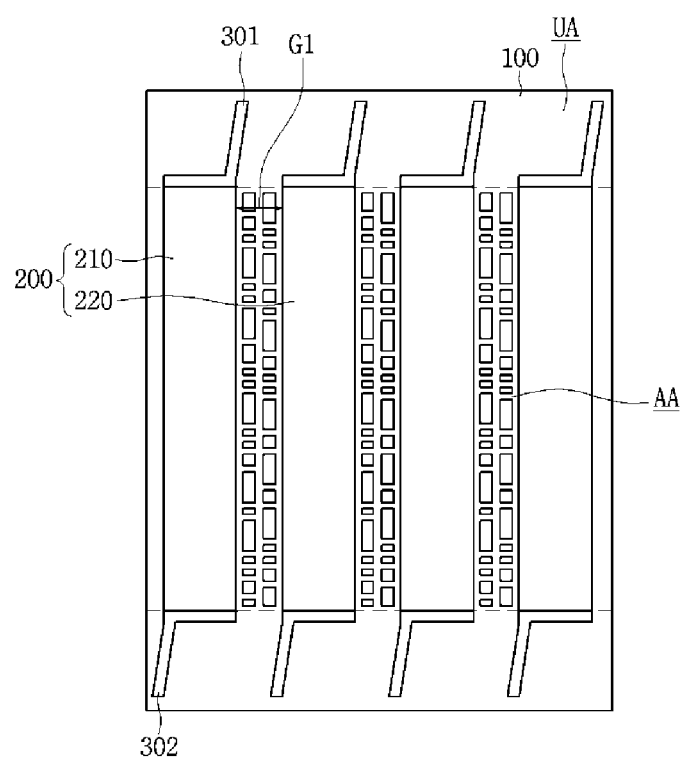

The plural pattern may be arranged regularly. That is, as shown in FIG. 22, the dummy part 250 may be formed by arranging the patterns having a constant size by a constant interval. Since the dummy part 250 has entirely regular optical characteristics, the visibility may be improved. Alternatively, as shown in FIG. 23, the patterns having irregular sizes may be arranged by irregular intervals.

Meanwhile, the gap G2 between the sensing electrode 200 and the dummy part 250 or between the patterns of the dummy part 250 may be in the range of about 1 µm to about 150 µm. Alternatively, the gap G2 may be in the range of about 1 µm to about 100 µm. Alternatively, the gap G2 may be in the range of about 1 µm to about 30 µm. Alternatively, the gap G2 may be in the range of about 1 µm to about 10 µm. Thus, the sensing electrode 200 and the patterns of the dummy part 250 may be prevented from being viewed. In addition, the optical characteristics and visibility of an electrode member, a touch window and a display including the sensing electrode 200 and the dummy part 250 may be improved.

Meanwhile, when the sensing electrode 200 is formed in a bar pattern, multi-touch recognition may be weak. For example, when multi-touch positions are spaced apart from each other in a horizontal direction, the variations of capacitance may occur at mutually different sensing electrodes 200, so that it may be possible to recognize the multi-touch. However, when the multi-touch occurs on the same line in a vertical direction, since the same sensing electrode 200 is touched, it may be difficult to recognize the multi-touch.

Hereinafter, a sensing electrode 200 according to another embodiment, which is capable of exactly recognizing the positions of a multi-touch, will be described with reference to FIGS. 24 and 25.

Figure 24:
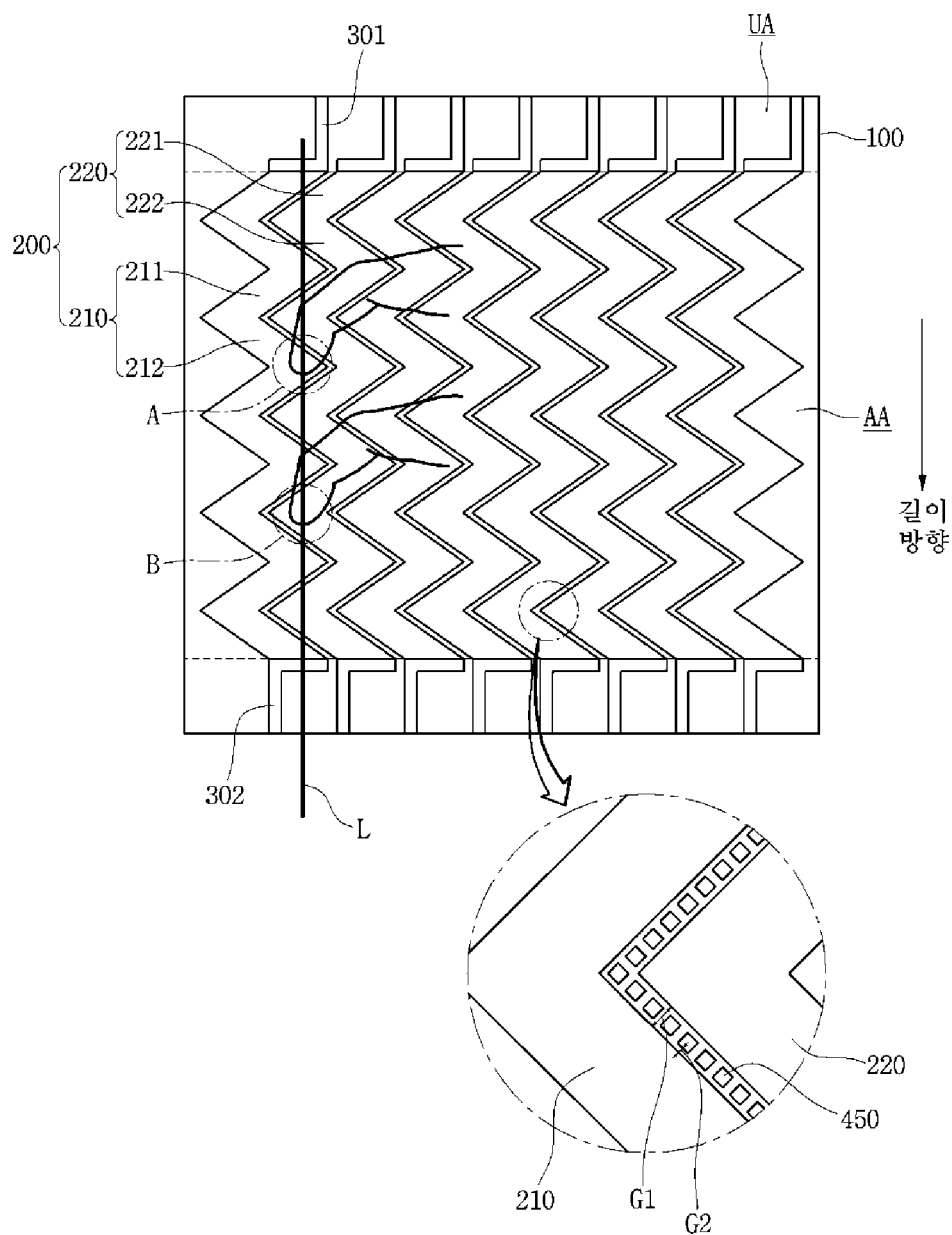

First, referring to FIG. 24, the first sensing electrode 210 may include a plurality of sensing parts having mutually different directionalities. For example, the first sensing electrode 210 may include first and second sensing parts 211 and 212. The second sensing part 212 may extend from the first sensing part 211.

The first and second sensing parts 211 and 212 may have mutually different directionalities. In detail, the first and second sensing parts 211 and 212 may extend in mutually different directions.

The second sensing part 212 may be bent from the first sensing part 211. The first and second sensing parts 211 and 212 may have a linear shape. As the first and second sensing parts 211 and 212 include linear lines, the first and second sensing parts 211 and 212 may have an L-shape.

In addition, the first and second sensing parts 211 and 212 may extend at various angles.

A plurality of first and second sensing parts 211 and 212 may be provided. The first and second sensing parts 211 and 212 may be alternately arranged with each other. The first and second sensing parts 211 and 212 may be alternately and repeatedly arranged with each other.

Meanwhile, wire electrodes 301 and 302 may be formed in the unactive area UA so that the wire electrodes 301 and 302 are electrically connected to the first sensing electrode 210. A plurality of wire electrodes 301 and 302 may be provided.

In other words, the wire electrodes 301 and 302 may include a first wire electrode 301 connected with one end of the first sensing electrode 210 and a second wire electrode 302 connected to an opposite end of the first sensing electrode 210. Therefore, the first wire electrode 301 may be withdrawn to an upper end of the substrate 100. In addition, the second wire electrode 302 may be withdrawn to a lower end of the substrate 100. Further, the wire electrodes 301 and 302 may be connected to a printed circuit board.

According to the embodiment, not only when at least two points on the same line in a horizontal direction of the sensing electrode 200 are simultaneously touched, but also when at least two points on the same line in a vertical direction of the sensing electrode 200 are simultaneously touched, the positions of the touched points may be exactly recognized. That is, when a virtual axis L is defined in a longitudinal direction of the substrate 100 and two points A and B on the same line along the virtual axis L are touched, the positions of the two points A and B may be detected through a portion of the first sensing electrode 210 and a portion of the second sensing electrode 220. In detail, the touch onto the point A may be sensed by the first sensing electrode 210 on the axis L, and the touch onto the point B may be sensed by the second sensing electrode 220 on the axis L. Accordingly, the accuracy in sensing the touch point may be improved, and the multi-touch may be implemented.

According to the embodiment, a dummy part 250 may be further interposed between the sensing parts 200. The dummy part 250 may be interposed between the first and second sensing parts 210 and 220. The dummy part 250 may include the same material as that of the sensing electrode 200. Thus, the optical characteristics and the visibility of the touch window may be improved through the dummy part 250.

Since the visibility is improved due to the disposition of the dummy part 250, the gap G1 between the sensing electrodes 200 may be increased. In detail, the gap G1 between the sensing electrodes 200 may correspond to a width of the sensing electrode 200. For example, the gap G1 between the first and second sensing electrodes 210 and 220 may be in the range of 150 µm to 16 mm. In detail, the gap G1 between the first and second sensing electrodes 210 and 220 may be in the range of 500 µm to 12 mm. In more detail, the gap G1 between the first and second sensing electrodes 210 and 220 may be in the range of 1 mm to 10 mm. When the gap G1 between the sensing electrodes 200 is less than 100 µm, the sensing electrodes 200 may be short-circuited with each other due to foreign substances. If the gap G1 between the sensing electrodes 200 exceeds 16 mm, when the gap G1 between the sensing electrodes 200 is touched, the touch sensibility may be degraded.

Figure 25:
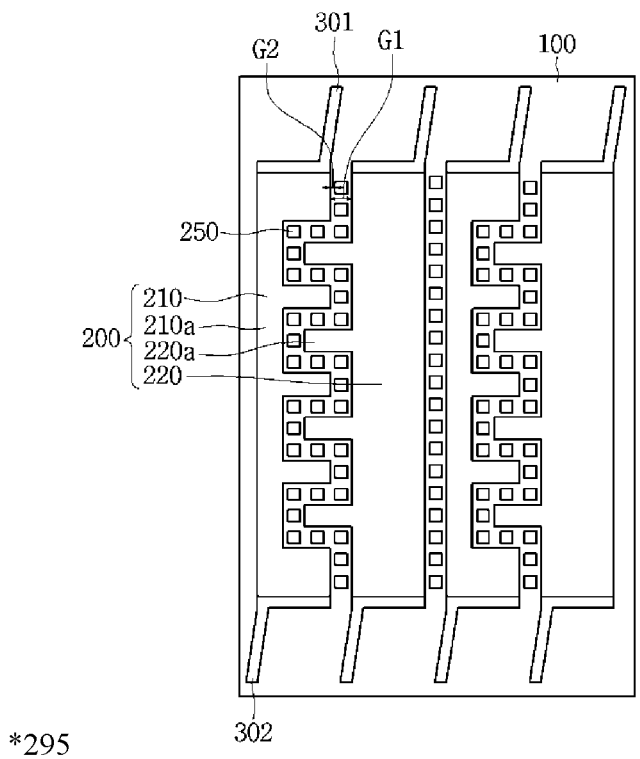

Next, referring to FIG. 25, the first and second sensing parts 210 and 220 may be arranged in a shape in which the first and second sensing parts 210 and 220 mesh with each other. In detail, the first sensing part 210 may include a concave part 210a, and the second sensing part 220 may include a convex part 220a. In this case, the convex part 220a is disposed in the concave part 210a so that the convex part 220a may correspond to the concave part 210a.

In addition, the dummy part 250 may be further interposed between the first and second sensing parts 210 and 220. In this case, the dummy part 250 may be provided even in the concave part 210a of the first sensing part 210.

Since the visibility is improved due to the disposition of the dummy part 250, the gap G1 between the sensing electrodes 200 may be increased. In detail, the gap G1 between the sensing electrodes 200 may correspond to a width of the sensing electrode 200. For example, the gap G1 between the first and second sensing electrodes 210 and 220 may be in the range of 150 µm to 16 mm. In detail, the gap G1 between the first and second sensing electrodes 210 and 220 may be in the range of 500 µm to 12 mm. In more detail, the gap G1 between the first and second sensing electrodes 210 and 220 may be in the range of 1 mm to 10 mm. When the gap G1 between the sensing electrodes 200 is less than 100 µm, the sensing electrodes 200 may be short-circuited with each other due to foreign substances. If the gap G1 between the sensing electrodes 200 exceeds 16 mm, when the gap G1 between the sensing electrodes 200 is touched, the touch sensibility may be degraded.

Figure 26:
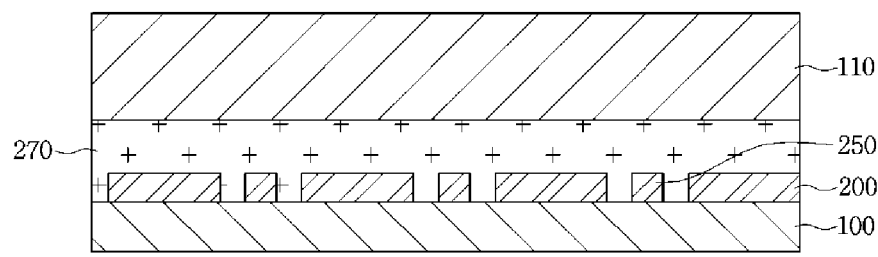
FIG. 26 is a sectional view of FIG. 20.

Referring to FIG. 26, a cover substrate 110 may be disposed on the substrate 100. The cover substrate 110 may include tempered glass. Optical clear adhesive (OCA) 270 may be interposed between the cover substrate 110 and the substrate 100.

Figure 27:
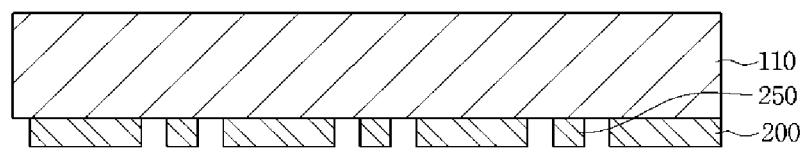
FIG. 27 is a sectional view of FIG. 20.

Next, referring to FIG. 27, a sensing electrode 200 may be in directly contact with a bottom surface of the a cover substrate 110.

Hereinafter, a touch window according to still another embodiment will be described with reference to FIGS. 28 to 33. The description about the elements and structures that have been described in the previous embodiment will be omitted.

Referring to FIGS. 28 to 33, the touch window according to still another embodiment may include a substrate 100, a sensing electrode 200, a wire electrode 300 and a printed circuit board 400.

The substrate 100 may have an active area AA and an unactive area UA defined therein.

Figure 28:
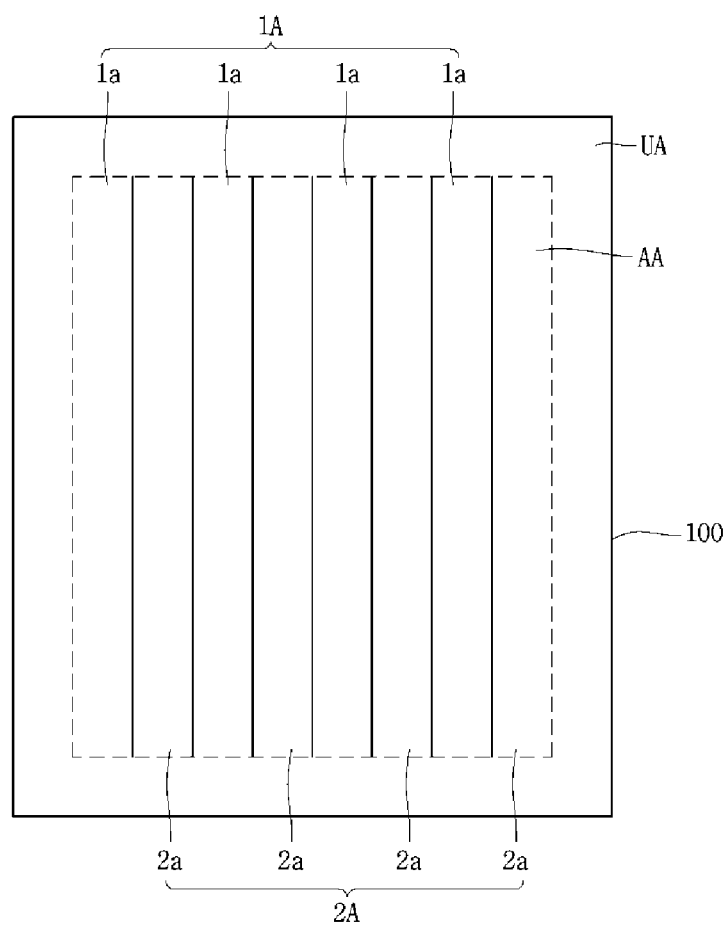
FIG. 28 is a schematic plan view showing a touch window according to still another embodiment.

In detail, as shown in FIG. 28, the substrate 100 may have first and second areas 1A and 2A defined therein. In more detail, the active area AA of the substrate 100 may include the first and second areas 1A and 2A defined therein.

The first area 1A may be defined as an area in which the sensing electrode 200 is disposed, and the second area 2A may be defined as an area in which the wire electrode 300 is disposed.

The sensing electrode 200 may be disposed on the substrate 100. In detail, the sensing electrode 200 may be disposed on at least one of the active area AA and the unactive area UA. Preferably, the sensing electrode 200 may be disposed on the active area AA of the substrate 100. That is, the sensing electrode 200 may be disposed on the first area 1A of the active area AA of the substrate 100.

The sensing electrode 200 may include a plurality of electrode patterns. The electrode patterns may be arranged in a matrix. Each of the electrode patterns may be connected to the wire electrode 300. Thus, the sensing electrode 200 according to the embodiment may recognize a touch position based on the capacitance varied between a touch object and an electrode pattern in touch.

In detail, the sensing electrode 200 may include the first and second sensing electrodes 210 and 220. The first and second sensing electrodes 210 and 220 may be disposed on the same surface of the substrate 100 while being spaced apart from each other, so that the first and second sensing electrodes 210 and 220 make non-contact with each other. According to the embodiment, a plurality of first and second sensing electrodes 210 and 220 may be arranged alternately with each other in a vertical direction. In addition, at least two rows, in which the first and second sensing electrodes 210 and 220 are arranged alternately with each other, may be arranged in a horizontal direction while be spaced apart from each other by a constant interval.

The pattern of the sensing electrode 200 may have a regular shape such as a rectangular shape or a pentagon shape, or random shape.

Figure 29:
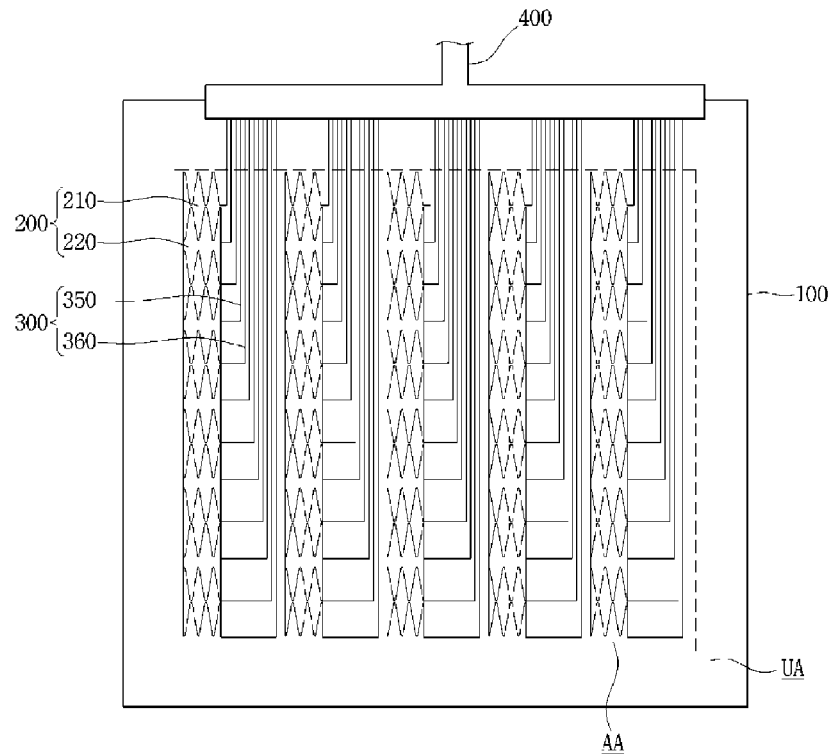
FIG. 29 is a plan view showing a touch window according to still another embodiment.

When the pattern of the sensing pattern 200 has a rectangular shape and a touch occurs between mutually adjacent sensing electrodes 200, it may be difficult to exactly recognize the touch position. Thus, as shown in FIG. 29, the first and second sensing electrodes 210 and 220 may include branch electrodes. The branch electrodes of the first sensing electrode 210 mesh with those of the second sensing electrode 220. Thus, even when a touch occurs between the first and second sensing electrodes 210 and 220, the touch may be exactly recognized, so that the touch sensibility may be improved.

In addition, the sensing electrodes 200 may be connected to the wire electrodes 300, respectively. That is, a plurality of first sensing electrodes 210 may be connected to a plurality of third wire electrodes 350, respectively. In addition, a plurality of second sensing electrodes 220 may be connected to a plurality of fourth wire electrodes 360, respectively. Thus, the sensing electrode 200 according to the embodiment may recognize a touch position based on the capacitance varied between a touch object and an electrode pattern in touch.

A dummy part 250 may be further interposed between the sensing parts 200. The dummy part 250 may be interposed between the first and second sensing parts 210 and 220. The dummy part 250 may include the same material as that of the sensing electrode 200. Thus, the optical characteristics and the visibility of the touch window may be improved through the dummy part 250

Since the visibility is improved due to the disposition of the dummy part 250, the gap between the sensing electrodes 200 may be increased. In detail, the gap between the sensing electrodes 200 may correspond to a width of the sensing electrode 200. For example, the gap between the first and second sensing electrodes 210 and 220 may be in the range of 150 µm to 16 mm. In detail, the gap between the first and second sensing electrodes 210 and 220 may be in the range of 500 µm to 12 mm. In more detail, the gap between the first and second sensing electrodes 210 and 220 may be in the range of 1 mm to 10 mm. When the gap between the sensing electrodes 200 is less than 100 µm, the sensing electrodes 200 may be short-circuited with each other due to foreign substances. If the gap between the sensing electrodes 200 exceeds 16 mm, when the gap between the sensing electrodes 200 is touched, the touch sensibility may be degraded.

Figure 30:
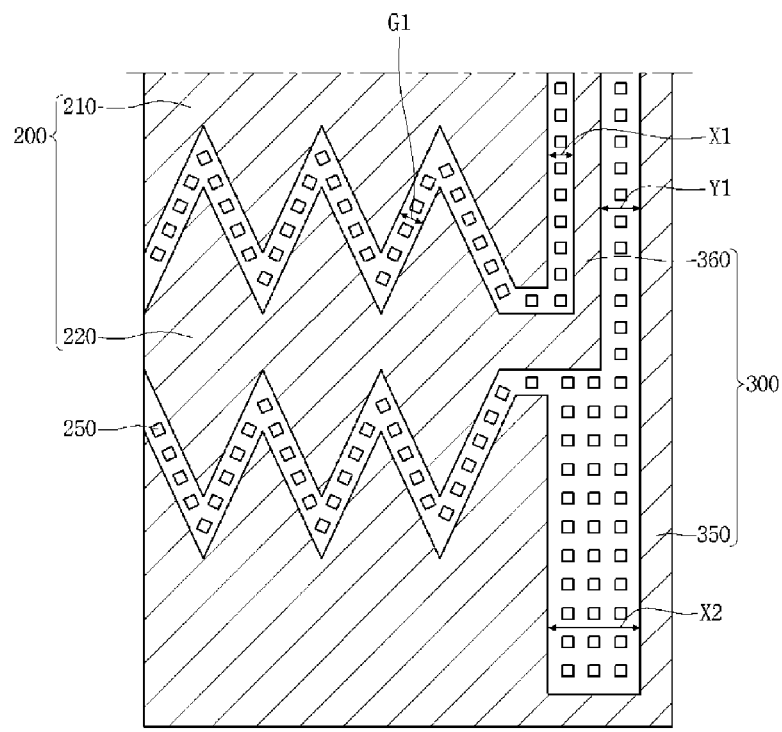
FIG. 30 is an enlarged view showing the sensing electrode of FIG. 29.

Meanwhile, as shown in FIG. 30, the dummy part 250 may be disposed on a gap X1 or X2 between the wire electrodes 300 adjacent to the sensing electrode 200. The dummy part 250 may be disposed even on the gap Y1 between the wire electrodes 300 adjacent to each other. The dummy part 250 may include the same material as that of the sensing electrode 200. Thus, as well as the sensing electrode 200, the visibility of the wire electrode 300 may be improved through the dummy part 250.

Figure 31:
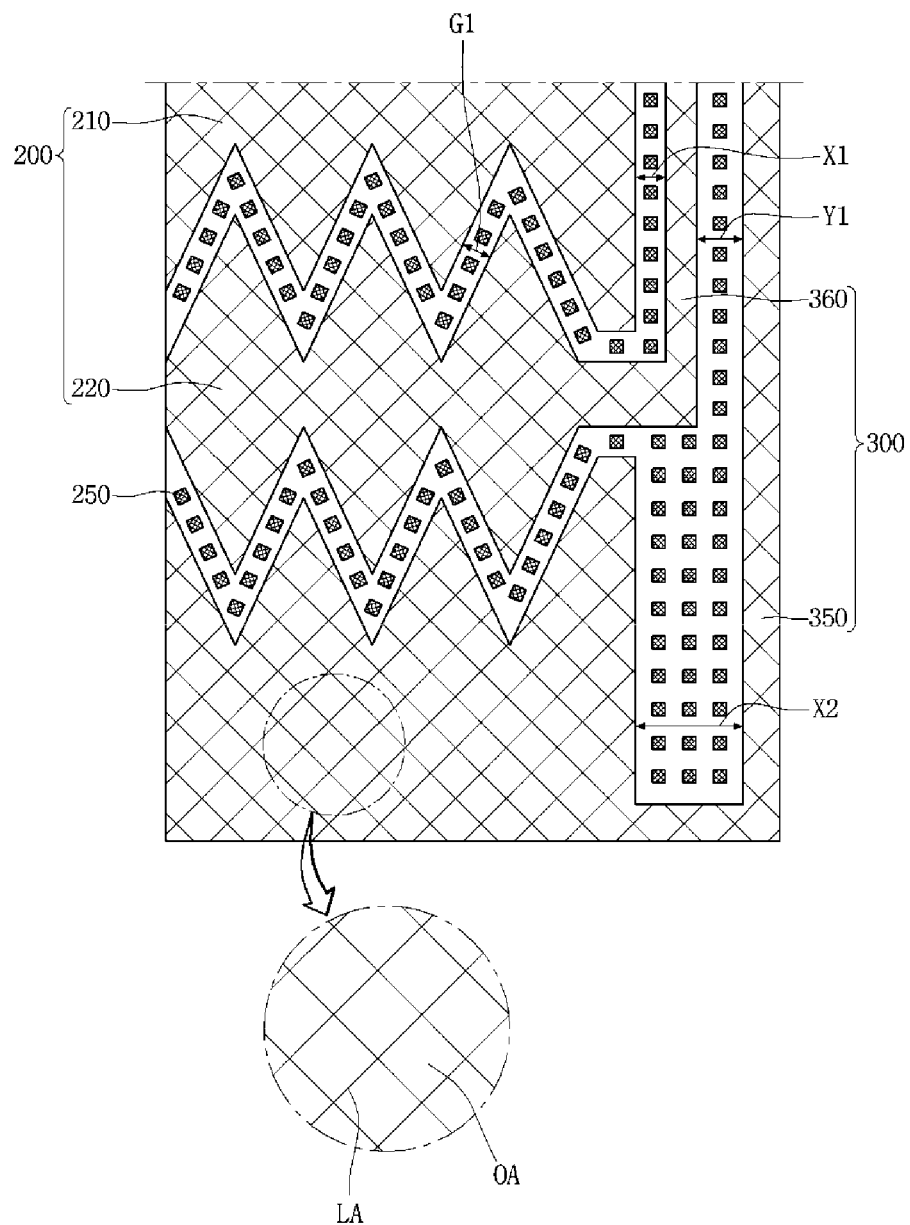
FIG. 31 is another enlarged view showing the sensing electrode of FIG. 29.

Referring to FIG. 31, at least one of the sensing electrode 200, the wire electrode 300 and the dummy part 250 may be formed in a mesh pattern. In detail, the sensing electrode 200, the wire electrode 300 and the dummy part 250 may include mesh lines LA formed by the plurality of sub-electrodes crossing each other in the mesh shape, and mesh opening parts OA formed between the mesh lines LA. In this case, a line width of the mesh line LA may be in the range of about 0.1 µm to about 10 µm. It may be impossible in terms of the fabrication process to form the mesh line LA having a line width less than about 0.1 µm. When the line width of the mesh line LA exceeds about 10 µm, the pattern of the sensing electrode 200 may be viewed from an outside so that the visibility may be degraded. The mesh line LA may have a line width in the range of about 1 µm to about 5 µm. Alternatively, the mesh line LA may have a line width in the range of about 1.5 µm to about 3 µm.

The mesh opening part OA may be formed in various shapes. For example, the mesh opening part OA may have various shapes such as a polygonal shape including a rectangular shape, a diamond shape, a pentagon shape or a hexagonal shape, or a circular shape. In addition, the mesh opening part OA may have a regular or random shape.

As the sensing electrode 200, the wire electrode 300 and the mesh part 250 have a mesh shape, the pattern of the sensing electrode 200 may be made not to be viewed in the active area AA. In other words, even when the sensing electrode 200 is formed of metal, the pattern may be made not to be viewed. In addition, even when the sensing electrode is applied to a large-size touch window, the resistance of the touch window may be reduced.

Figure 32:
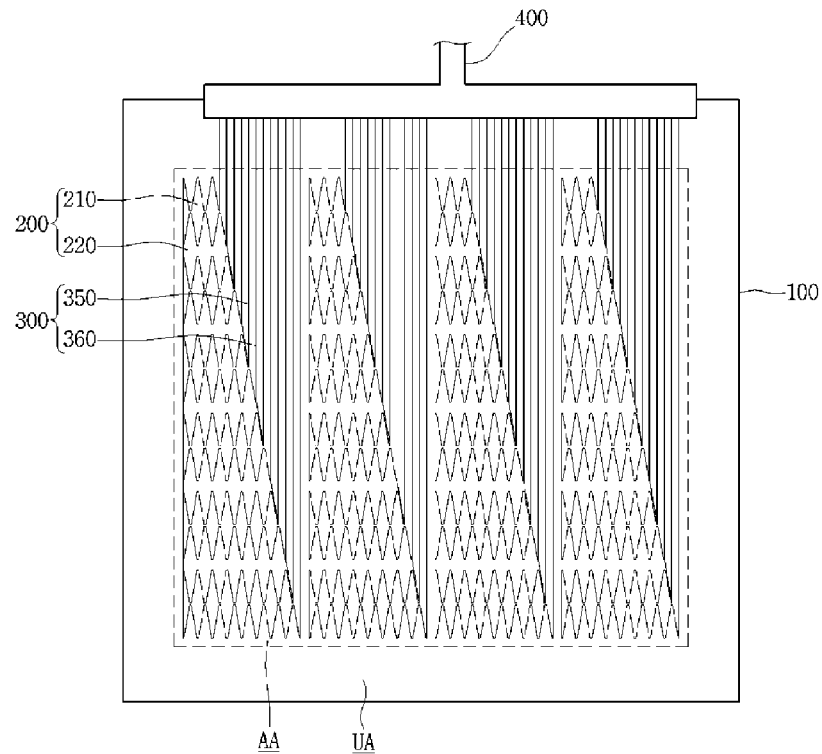
FIG. 32 is a plan view showing a touch window according to still another embodiment.

Meanwhile, referring to FIG. 32, the distance between the sensing electrode 200 and the wire electrode 300 connected thereto may be gradually enlarged as the wire electrode 300 is lengthened. Thus, the touch sensitivity between the sensing electrode 200 and the wire electrode 300 may be degraded.

Figure 33:
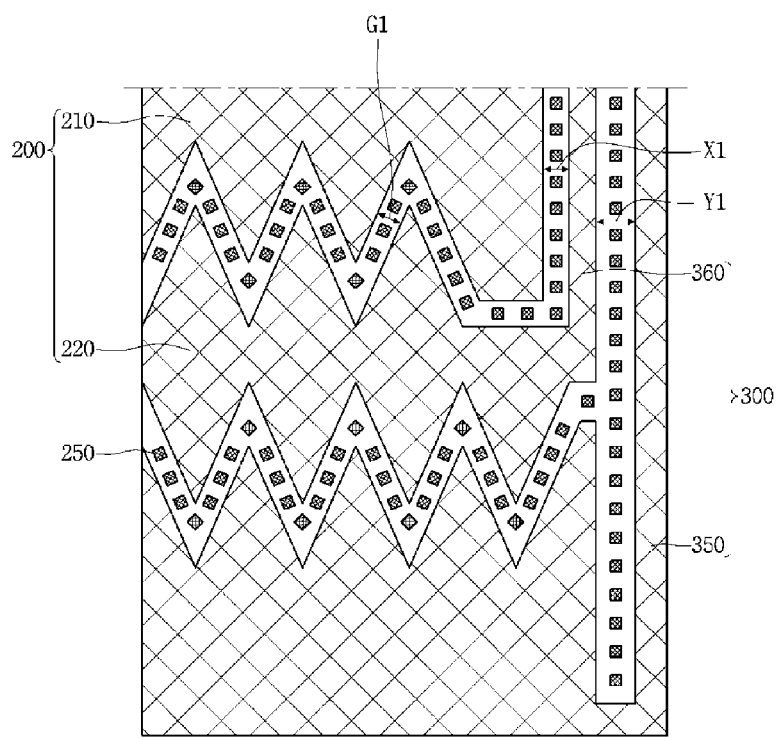
FIG. 33 is an enlarged view showing the electrode of FIG. 32.

To prevent the above, as shown in FIG. 33, the sensing electrodes 200 may be formed to have mutually different sizes.

In detail, as the wire electrode 300 connected to the sensing electrode 200 is lengthened, the pattern size of the sensing electrode 200 may be gradually enlarged. In another aspect of the embodiment, as the sensing electrode 200 comes away from the printed circuit board 400, the pattern of the sensing electrode 200 may be gradually enlarged.

Thus, the touch sensitivity and accuracy of the touch window according to the embodiment may be more improved.

Referring to FIG. 33, at least one of the sensing electrode 200, the wire electrode 300 and the dummy part 250 may be formed in a mesh pattern. In detail, the sensing electrode 200, the wire electrode 300 and the dummy part 250 may include mesh lines LA formed by the plurality of sub-electrodes crossing each other in the mesh shape, and mesh opening parts OA formed between the mesh lines LA. In this case, a line width of the mesh line LA may be in the range of about 0.1 µm to about 10 µm. It may be impossible in terms of the fabrication process to form the mesh line LA having a line width less than about 0.1 µm. When the line width of the mesh line LA exceeds about 10 µm, the pattern of the sensing electrode 200 may be viewed from an outside so that the visibility may be degraded. The mesh line LA may have a line width in the range of about 1 µm to about 5 µm. Alternatively, the mesh line LA may have a line width in the range of about 1.5 µm to about 3 µm.

The mesh opening part OA may be formed in various shapes. For example, the mesh opening part OA may have various shapes such as a polygonal shape including a rectangular shape, a diamond shape, a pentagon shape or a hexagonal shape, or a circular shape. In addition, the mesh opening part OA may have a regular or random shape.

As the sensing electrode 200, the wire electrode 300 and the dummy part 250 have a mesh shape, the pattern of the sensing electrode 200 may be made not to be viewed in the active area AA. In other words, even when the sensing electrode 200 is formed of metal, the pattern may be made not to be viewed. In addition, even when the sensing electrode 200 is applied to a large-size touch window, the resistance of the touch window may be reduced.

Figure 34:
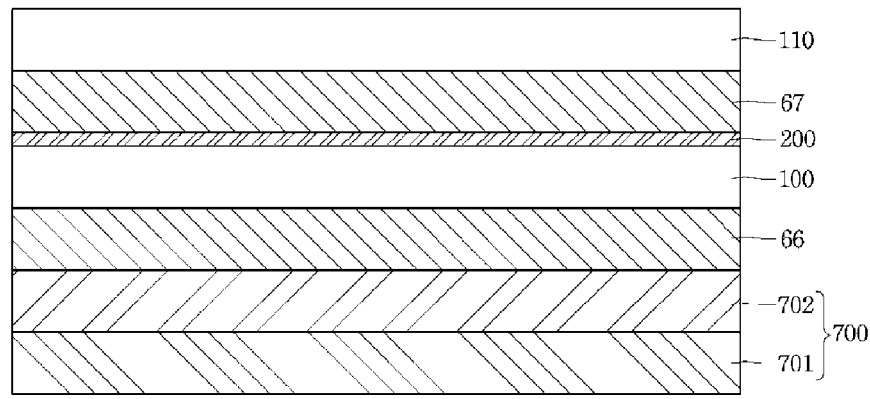
FIGS. 34 to 36 are views showing a touch device formed by coupling a touch window and a display panel to each other according to an embodiment.
Figure 36:
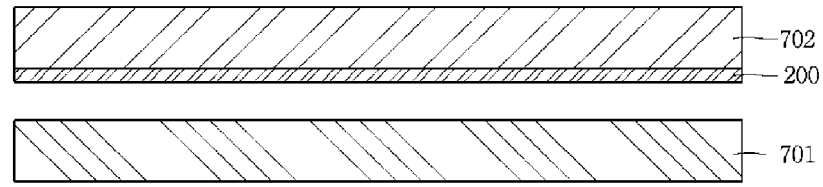

Referring to FIGS. 34 and 36, a display panel 700 may be coupled onto the touch window. When the display panel 700 is a liquid crystal display panel, the display panel 700 may have a structure in which the first substrate 701 including a thin film transistor (TFT) and a pixel electrode is combined with the second substrate 702 including color filter layers while a liquid crystal layer is interposed between the first and second substrates 701 and 702.

Further, the display panel 700 may be a liquid crystal display panel having a color filter on transistor (COT) structure formed by combining the first substrate 701 formed thereon with a TFT, a color filter, and a black matrix with the second substrate 702 while the liquid crystal layer is interposed between the first and second substrates 701 and 702. In other words, the TFT may be formed on the first substrate 701, a protective layer may be formed on the TFT, and the color filter layer may be formed on the protective layer. In addition, the pixel electrode, which makes contact with the TFT, is formed on the first substrate 701. In this case, to improve an aperture ratio and simplify a mask process, the black matrix may be omitted, and a common electrode may perform a function of the black matrix together with the inherent function thereof.

In addition, if the display panel 700 is a liquid crystal panel, the display device may further include a backlight unit to supply light onto a rear surface of the display panel 700.

When the display panel 700 is an organic light emitting display panel, the display panel 700 includes a self-emissive device that does not require an additional light source. The display panel 700 includes the TFT formed on the first substrate 701 and an organic light emitting device making contact with the TFT. The organic light emitting device may include an anode, a cathode, and an organic light emitting layer interposed between the anode and the cathode. In addition, the display panel 700 may further include the second substrate 702 formed on the organic light emitting device and serving as an encapsulation substrate for encapsulation.

Referring to FIG. 34, the touch window described above may be disposed on the display panel 700 and the display panel and the touch window may adhere to each other by using a first adhesive layer 600. In addition, the cover substrate 110 may be disposed on the touch window and the touch window and the cover substrate 110 may adhere to each other by using a second adhesive layer 67.

Figure 35:
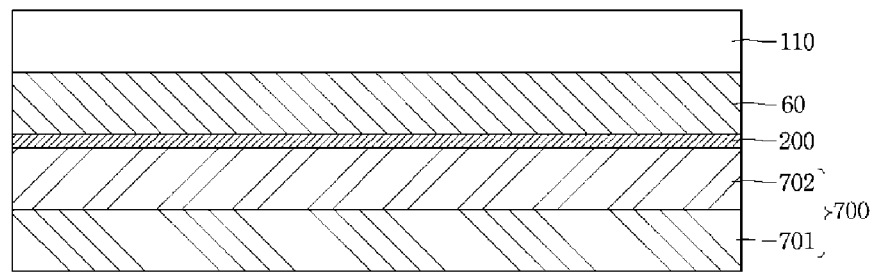

Referring to FIG. 35, the sensing electrode 200 may be disposed on at least one surface of the display panel 700. In detail, the sensing electrode at least one surface of the first or second substrate 701 or 702. In addition, the cover substrate 110 may be disposed on the touch window and the touch window and the cover substrate 110 may adhere to each other by using an adhesive layer 60.

Referring to FIG. 36, the sensing electrode 200 may be interposed between the first and second substrates 701 and 702.

Thus, the touch device according to the embodiment may allow the substrate supporting the sensing electrode 200 to be omitted. For this reason, a touch device having a thin thickness and a light weight may be formed.

Hereinafter, one example of a display device, to which the touch window according to the embodiment described above is applied, will be described with reference to FIGS. 37 to 40.

Figure 37:
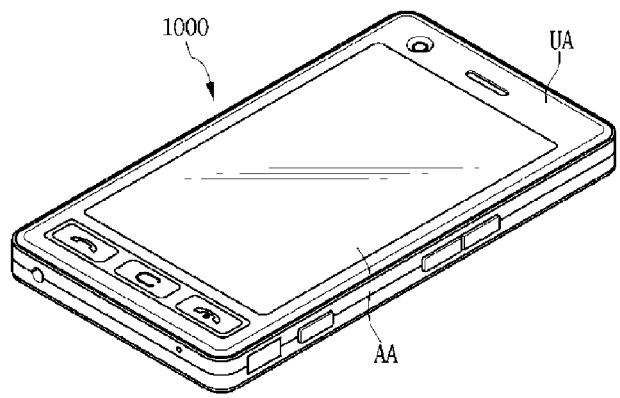
FIGS. 37 to 40 are views showing a touch device to which a touch window according to an embodiment is applied.

Referring to FIG. 37, there is shown a mobile terminal as one example of the touch device. The mobile terminal 1000 may include an active area AA and an unactive area UA. The active area may sense a touch signal when a finger touches the active area AA, and an instruction icon pattern part and a logo may be formed in the unactive area UA.

Figure 38:
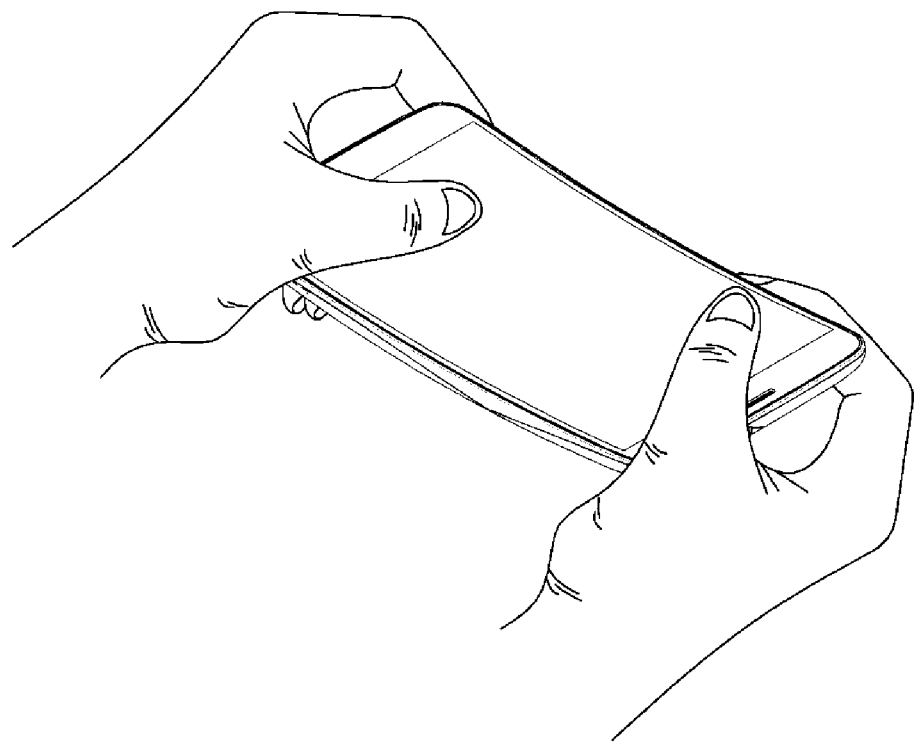

Referring to FIG. 38, the touch window may include a flexible touch window. Thus, a touch device including it may be a flexible touch device. Therefore, a user may flex or bend the touch device with his hand.

Figure 39:
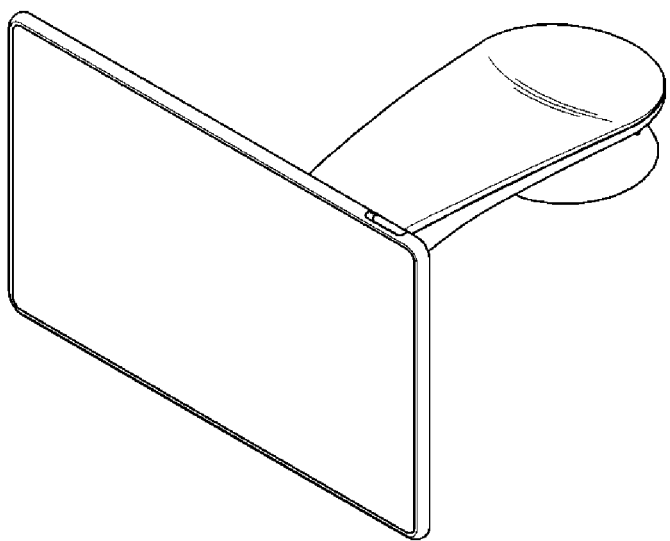

Referring to FIG. 39, the touch window may be applied to a vehicle navigation system as well as the touch device of a mobile terminal.

Figure 40:

In addition, referring to FIG. 40, the touch panel may be applied to a vehicle. That is, the touch panel may be applied to various parts in a vehicle to which a touch panel is applicable. Accordingly, the touch panel is applied to a dashboard as well as a PND (Personal Navigation Display), so that a CID (Center Information Display) may be implemented. However, the embodiment is not limited to the embodiment and the touch device may be used for various electronic appliances.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

The touch window according to an embodiment may have improved reliability and visibility, so that the touch window may be applied to a vehicle navigation system as well as a touch device of the mobile terminal.

The invention claimed is:
1. A touch window comprising:
a substrate including an active area and an unactive area defined therein;
a sensing electrode on the substrate; and
a wire electrode connected to the sensing electrode, wherein the wire electrode includes a first wire electrode, a second wire electrode and a reinforcement electrode connected to the first and second wire electrodes, at least one of the first and second wire electrodes and the reinforcement electrode is formed in a mesh shape, and the wire electrode extends from the active area to the unactive area, wherein at least one of the first and second wire electrodes and the reinforcement electrode is disposed on the active area, wherein the touch window further comprises a printed circuit board connected to the second wire electrode on the unactive area, wherein the second wire electrode includes a first sub-second wire electrode connected to the reinforcement electrode and a second sub-second wire electrode connected to the printed circuit board, and wherein the first sub-second wire electrode has a width different from a width of the second sub-second wire electrode.

2. The touch window of claim 1, wherein the first wire electrode includes a first mesh line, the reinforcement electrode includes a second mesh line, and the first mesh line has a width different from a width of the second mesh line.

3. The touch window of claim 2, wherein the line width of the second mesh line is wider than that of the first mesh line.

4. The touch window of claim 2, wherein the second wire electrode is a bulk wire.

5. The touch window of claim 1, wherein the first wire electrode includes first mesh lines having a first pitch, the reinforcement wire includes second mesh lines having a second pitch, and the first pitch is greater than the second pitch.

6. The touch window of claim 1, wherein the reinforcement extends from the first wire electrode toward the second wire electrode and has a width which varies in a direction from the first wire electrode to the second wire electrode.

7. The touch window of claim 1, wherein the reinforcement electrode extends from the first wire electrode toward the second wire electrode and has a width which is gradually narrowed from the first wire electrode to the second wire electrode.

8. The touch window of claim 1, wherein the sensing electrode includes a first sub-sensing electrode and a second sub-sensing electrode which are spaced part from each other, wherein the wire electrode includes a wire electrode of the first sub-sensing electrode connected to the first sub-sensing electrode; and a wire electrode of the second sub-sensing electrode connected to the second sub-sensing electrode, wherein the wire electrode of the first sub-sensing electrode includes a third wire electrode disposed on the active area; a fourth wire electrode disposed on the unactive area; and a first reinforcement electrode connected to the third and fourth wire electrodes, wherein the wire electrode of the second sub-sensing electrode includes a fifth wire electrode disposed on the active area; a sixth wire electrode disposed on the unactive area; and a second reinforcement electrode connected to the fifth and sixth wire electrodes, wherein the first and second reinforcement electrodes are spaced apart from each other, and wherein a ratio between at least one of the first and second reinforcement electrodes and a spaced distance between the first and second reinforcement electrodes is in a range of 1:1 to 10:1.

9. The touch window of claim 1, wherein the sensing electrode includes a plurality of sensing electrodes arranged in a matrix on one surface of the substrate, and wherein a dummy part is provided between the sensing electrodes and between the sensing electrodes and the wire electrode.

10. The touch window of claim 9, wherein a distance between the sensing electrodes and a distance between the sensing electrode and the wire electrode are in a range of 150 µm to 16 mm.

11. The touch window of claim 9, wherein the sensing electrodes and the wire electrodes have a mesh shape.

12. The touch window of claim 1, wherein at least one of the first and second wire electrodes and the reinforcement electrode is disposed on the unactive area.

13. The touch window of claim 1, wherein the first wire electrode includes a first mesh line, wherein the reinforcement electrode includes a second mesh line, wherein the line width of the second mesh line is wider than that of the first mesh line, wherein the first pitch is greater than the second pitch.

14. The touch window of claim 1, wherein the width of the second sub-second wire electrode is wider than the width of the first sub-second wire electrode.

15. The touch window of claim 1, wherein the first wire electrode, the second wire electrode, and the reinforcement electrode includes mesh line.

16. The touch window of claim 1, wherein the sensing electrode includes first and second sensing electrodes, wherein the first and second sensing electrodes include mesh line.

17. The touch window of claim 16, wherein the first and second sensing electrodes are disposed on the same surface of the substrate.

18. The touch window of claim 1, wherein the substrate is bent to have a partial flat surface and a partial curved surface.

19. The touch window of claim 18, wherein an end of the substrate is bent to have a curved surface.

20. The touch window of claim 1, wherein the first and second wire electrodes and the reinforcement electrode are formed integrally with each other.

* * * * *